United States Patent
Jo et al.

(10) Patent No.: US 11,825,453 B2
(45) Date of Patent: Nov. 21, 2023

(54) METHOD FOR RECEIVING SLOT FORMAT-RELATED INFORMATION IN WIRELESS COMMUNICATION SYSTEM, AND TERMINAL USING SAME

(71) Applicant: LG ELECTRONICS INC., Seoul (KR)

(72) Inventors: Soonki Jo, Seoul (KR); Yunjung Yi, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 17/259,142

(22) PCT Filed: Jul. 5, 2019

(86) PCT No.: PCT/KR2019/008314
§ 371 (c)(1),
(2) Date: Jan. 8, 2021

(87) PCT Pub. No.: WO2020/013536
PCT Pub. Date: Jan. 16, 2020

(65) Prior Publication Data
US 2021/0160869 A1    May 27, 2021

(30) Foreign Application Priority Data
Jul. 10, 2018 (KR) ........................ 10-2018-0079677

(51) Int. Cl.
*H04W 72/0446* (2023.01)
*H04W 74/08* (2009.01)

(52) U.S. Cl.
CPC ... *H04W 72/0446* (2013.01); *H04W 74/0808* (2013.01)

(58) Field of Classification Search
CPC ................... H04W 725/0446; H04W 74/0808
See application file for complete search history.

(56) References Cited

U.S. PATENT DOCUMENTS

2018/0227911 A1* 8/2018 Belghoul .......... H04W 72/0446
2019/0039616 A1* 2/2019 Leff Yaffe ............. H04W 4/029
(Continued)

FOREIGN PATENT DOCUMENTS

WO    2017138920      8/2017
WO    WO-2019192449 A1 * 10/2019 ............ H04W 16/14

OTHER PUBLICATIONS

PCT Internation Application No. PCT/KR2019/008314, International Search Report dated Oct. 11, 2019, 4 pages.
(Continued)

*Primary Examiner* — Gary Mui
(74) *Attorney, Agent, or Firm* — LEE HONG DEGERMAN KANG WAIMEY

(57) ABSTRACT

The present disclosure relates to a method for receiving Slot Format related Information (SFI) performed by a user equipment (UE) in a wireless communication system including receiving the SFI from a base station, wherein the SFI is information informing a slot format for at least one slot; and performing a wireless communication in the unlicensed band based on an application of the slot format to the at least one slot, wherein the SFI is received in every predetermined slot number or in every predetermined time.

15 Claims, 20 Drawing Sheets

(56) References Cited

U.S. PATENT DOCUMENTS

| | | | | |
|---|---|---|---|---|
| 2019/0182829 A1* | 6/2019 | Choi | ................. | H04W 72/0446 |
| 2019/0191322 A1* | 6/2019 | Sun | ....................... | H04L 5/0094 |
| 2020/0229231 A1* | 7/2020 | Oh | ....................... | H04W 80/08 |
| 2021/0368541 A1* | 11/2021 | Hedayat | ................ | H04L 5/0091 |

OTHER PUBLICATIONS

Nokia, Nokia Shanghai Bell, "On the slot format related information on group-common PDCCH in NR," 3GPP TSG-RAN WG1#90, R1-1714063, Aug. 2017, 5 pages.

Intel Corporation, "On group-common PDCCH" 3GPP TSG RAN WG1 Meeting#90bis, R1-17171380, Oct. 2017, 13 pages.

ZTE, Sanechips, "Remaining issues for slot format," 3GPP TSG RAN WG1 Meeting AH 1801, R1-1800131, Jan. 2018, 13 pages.

Huawei, HiSilicon, "NR frame structure and scheduling on unlicensed bands," 3GPP TSG RAN WG1 Meeting#92bis, R1-1803678, Apr. 2018, 10 pages.

* cited by examiner

METHOD FOR RECEIVING SLOT FORMAT-RELATED INFORMATION IN WIRELESS COMMUNICATION SYSTEM, AND TERMINAL USING SAME

CROSS-REFERENCE TO RELATED APPLICATIONS

This application is the National Stage filing under 35 U.S.C. 371 of International Application No. PCT/KR2019/008314, filed on Jul. 5, 2019, which claims the benefit of earlier filing date and right of priority to Korean Patent Application No. 10-2018-0079677 filed on Jul. 10, 2018, the contents of which is hereby incorporated by reference herein in its entirety.

BACKGROUND OF THE DISCLOSURE

Field of the Disclosure

The present disclosure relates to a wireless communication, and more particularly, to a method for receiving slot format related information in a wireless communication system and a user equipment using the method.

Related Art

Recently, the 3rd generation partnership project (3GPP) standards development organizations (SDOs) are considering to use a network slicing scheme to implement a plurality of logical networks on a single physical network for the New RAT (NR) system, which is the 5G wireless communication system. To implement the logical network, a scheme employing Orthogonal Frequency Division Multiplexing (OFDM) is being considered, which is capable of supporting services imposing various operating conditions (for example, eMBB, mMTC, and URLLC) and providing variable numerologies according to the various services in the physical layer of the NR system. In other words, the NR system may consider to adopt an OFDM scheme (or a multiple access scheme) providing an independent numerology for each time and frequency resource region.

Recently, as mobile traffics are increasing explosively, additional licensed bands are required in order to process such the increasing mobile traffics through licensed bands. However, licensed bands are limited resources. Since a licensed band is obtained usually through an auction held among operators, astronomical investment may be demanded for obtaining an additional licensed band. In order to resolve the above-described problem, a method for providing LTE service or NR service through an unlicensed band may be considered.

Meanwhile, in an unlicensed band (U band), even in the case that a slot format is defined, the resources on which a user equipment operates may change every hour. In the case that a user equipment operates in a resource direction, it is good to perform an agreed operation with a network. However, a network is unable to know the time when a user equipment operates, a predefined agreement is required for a stable access in a U band.

Accordingly, the present disclosure proposes a method for a user equipment to receive slot format related information and an apparatus using the same.

SUMMARY

The present disclosure provides a method for receiving slot format related information in a wireless communication system and a user equipment using the method.

In an aspect, a method for receiving Slot Format related Information (SFI) performed by a user equipment (UE) that supports a wireless communication in an unlicensed band in a wireless communication system is provided. The method may comprise receiving the SFI from a base station, wherein the SFI is information informing a slot format for at least one slot and performing the wireless communication in the unlicensed band based on an application of the slot format to the at least one slot, wherein the SFI is received in every predetermined slot number or in every predetermined time.

When the SFI is not received in a scheduled slot or a scheduled time, the UE may attempt to receive the SFI persistently.

The slot format may defined for a predetermined period of slot or time without regard to listen before talk (LBT) or sensing.

The UE may apply the slot format from a slot on which the SFI is received or applies the slot format from an Nth slot after the slot on which SFI is received, and wherein the N is a positive integer.

When the UE applies the slot format from the Nth slot after the slot on which SFI is received, the UE may receive an offset value for the N from the base station.

When a time on receiving the SFI is a middle time among the slots on which the slot format is defined, the UE may apply the slot format from time on receiving the SFI to a remaining slot on which the slot format is defined.

The UE may communicate with at least one of a mobile terminal, a network and an autonomous driving vehicle except the UE.

The UE may implement at least one Advanced Driver Assistance System (ADAS) function based on a signal for controlling a motion of the UE, or wherein the UE receives a user input and switches a driving mode of the UE from an autonomous driving mode to a manual driving mode or switches a driving mode of the UE from a manual driving mode to an autonomous driving mode, or wherein the UE drives autonomously based on external object information, and wherein the external object information includes at least one of information on an existence of the object, position information of the object, distance information between the UE and the object and relative velocity information between the UE and the object.

In another aspect, a User Equipment (UE) is provided. The UE may comprise a transceiver for transmitting and receiving a wireless signal and a processor operating with being coupled with the transceiver, wherein the processor is configured to: receive Slot Format related Information (SFI) from a base station, wherein the SFI is information informing a slot format for at least one slot and perform a wireless communication in the unlicensed band based on an application of the slot format to the at least one slot, wherein the SFI is received in every predetermined slot number or in every predetermined time.

When the SFI may not be received in a scheduled slot or a scheduled time, wherein the UE attempts to receive the SFI persistently.

The slot format may be defined for a predetermined period of slot or time without regard to listen before talk (LBT) or sensing.

The UE may apply the slot format from a slot on which the SFI is received or applies the slot format from an Nth slot after the slot on which SFI is received, and wherein the N is a positive integer.

When the UE may apply the slot format from the Nth slot after the slot on which SFI is received, wherein the UE receives an offset value for the N from the base station.

A time on receiving the SFI is a middle time among the slots on which the slot format may be defined, the UE applies the slot format from time on receiving the SFI to a remaining slot on which the slot format is defined.

In other aspect, a method for transmitting Slot Format related Information (SFI) performed by a base station in a wireless communication system is provided. The method may comprise transmitting the SFI to a user equipment, wherein the SFI is information informing a slot format for at least one slot and wherein the SFI is transmitted in every predetermined slot number or in every predetermined time.

Advantageous Effects

According to the present disclosure, when a base station transmits slot format related information (SFI) to a user equipment, for example, the SFI may be transmitted in every predetermined slot number or every predetermined time (or a transmission is attempted every predetermined slot number or every predetermined time). Accordingly, a time when a user equipment receives the SFI from a base station becomes clear, and a stability of a wireless communication system may be improved.

DESCRIPTION OF EXEMPLARY EMBODIMENTS

In what follows, for those terms or acronyms not defined separately, the 3GPP TS 36 series or TS 38 series may be referred to.

Figure 1:
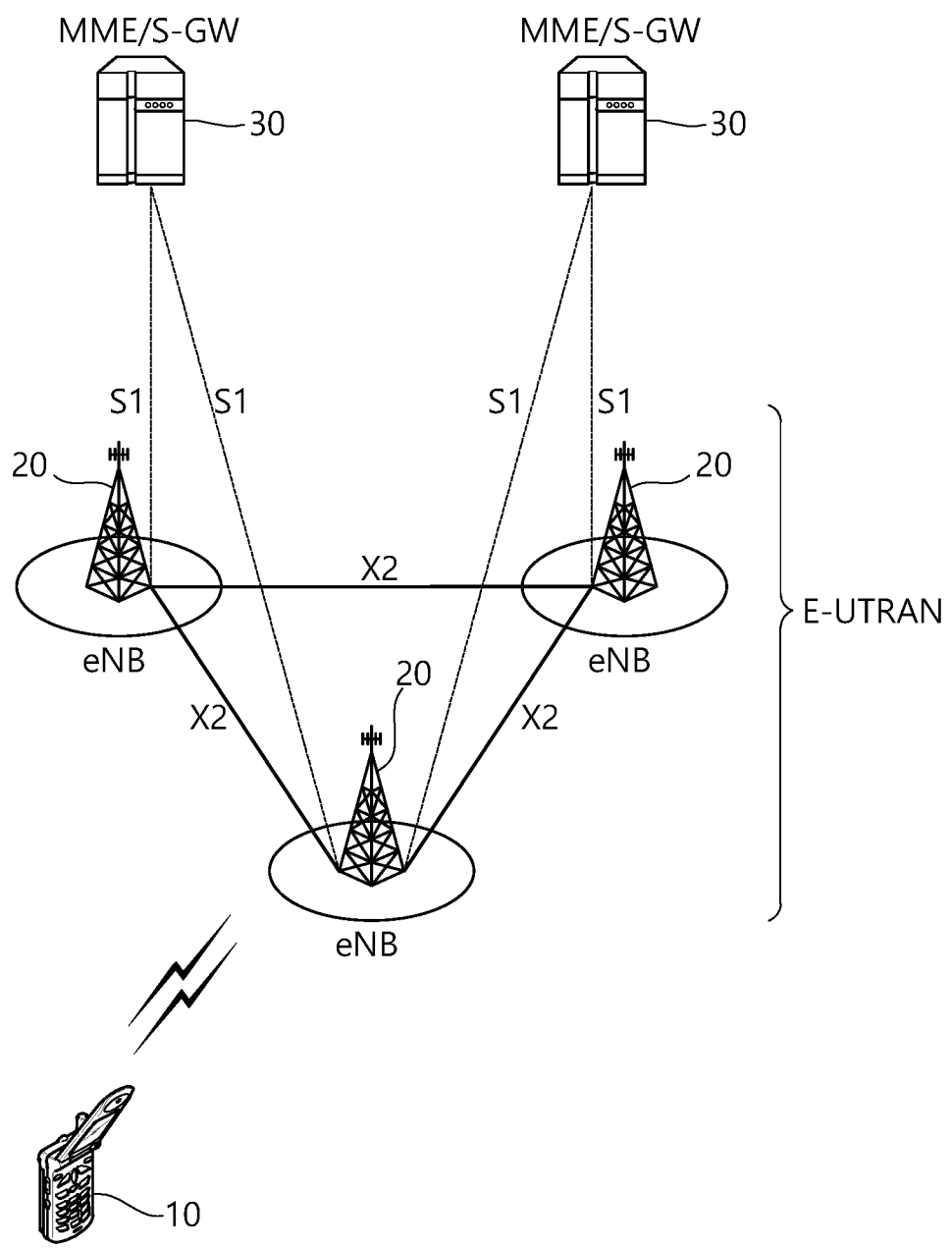
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
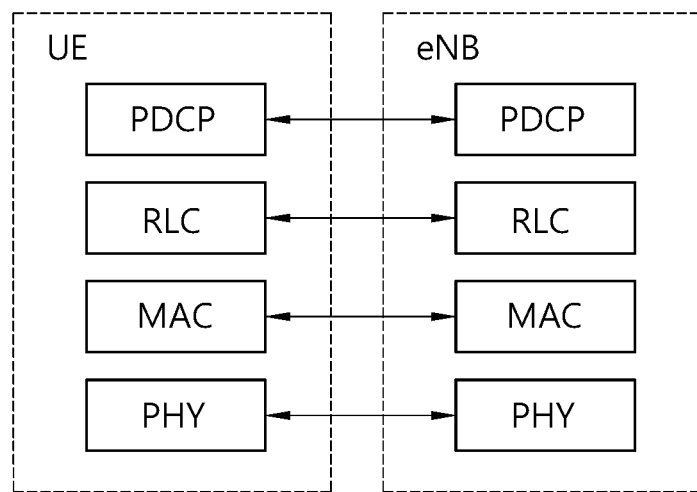
FIG. 2 is a diagram showing a wireless protocol architecture for a user plane.
Figure 3:
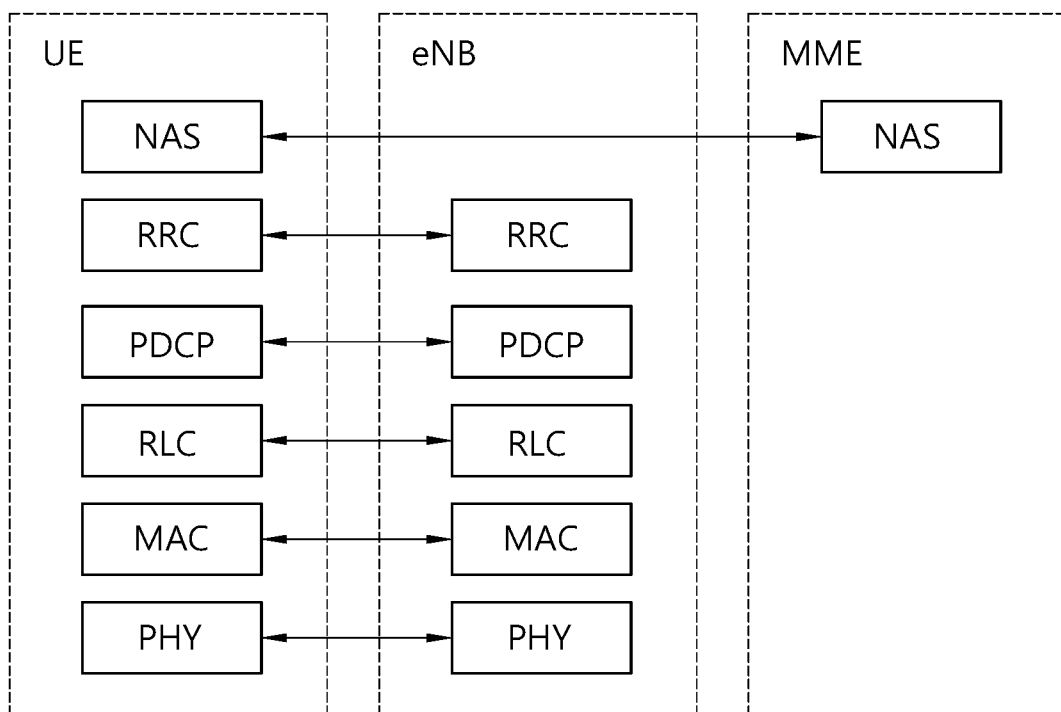
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 4:
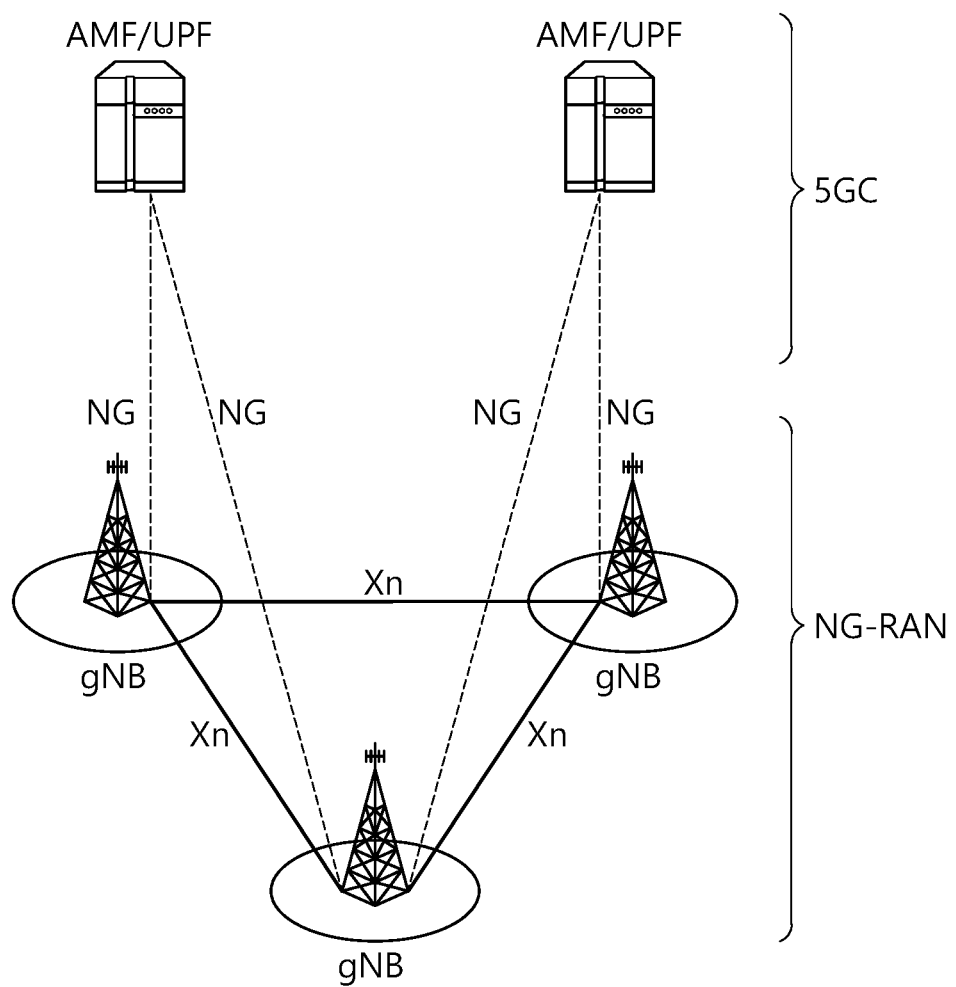
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
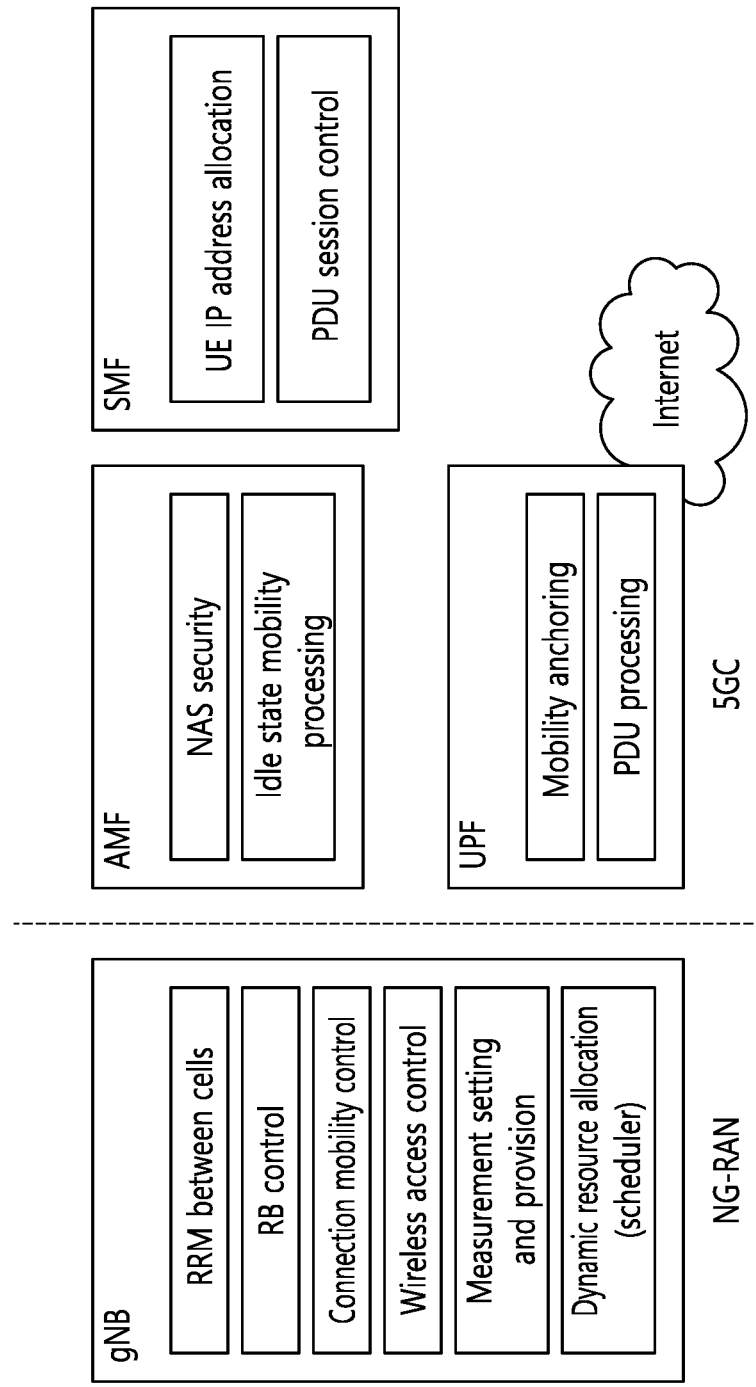
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

<New RAT (NR)>

As more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE has been discussed.

As such, the introduction of next generation RAT has been discussed, which considers enhanced mobile broadband communication (eMBB), massive MTC (mMTC), ultrareliable and low latency communication (URLLC), and the like. This new technology is called NR in the present disclosure for the convenience of description.

<Frame Structure for NR>

Figure 6:
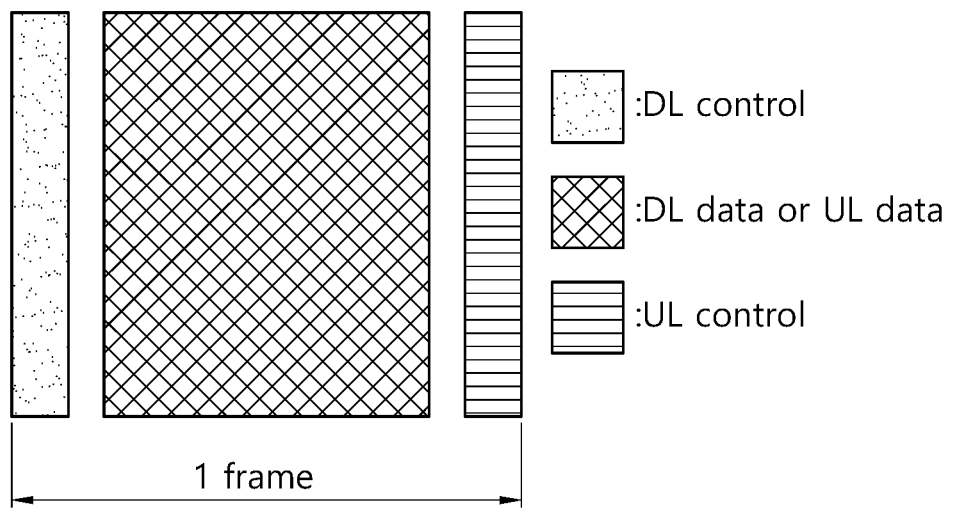
FIG. 6 schematically illustrates an example of a frame structure of the NR system.

FIG. 6 schematically illustrates an example of a frame structure of the NR system.

Referring to FIG. 6, the frame structure of NR is characterized by a self-contained structure which includes all of DL control channel, DL or UL data, UL control channel, and the like in a single unit (or Transmission Time Interval (TTI) or slot).

In this case, DL data scheduling information, UL data scheduling information, and the like may be transmitted through DL control channel. ACK/NACK information, CSI information (modulation and coding scheme information, MIMO transmission related information, etc.), a scheduling request, and the like may be transmitted through UL control channel.

In FIG. 6, between the control region and the data region, a time gap for DL-to-UL or UL-to-DL switching may be present.

In addition, a part of DL control/DL data/UL data/UL control may not be configured within a single frame. Alternatively, an order for channels that configure a single frame (e.g., DL control/DL data/UL control/UL data or UL control/UL data/DL control/DL data, etc.) may be changed.

Figure 7:
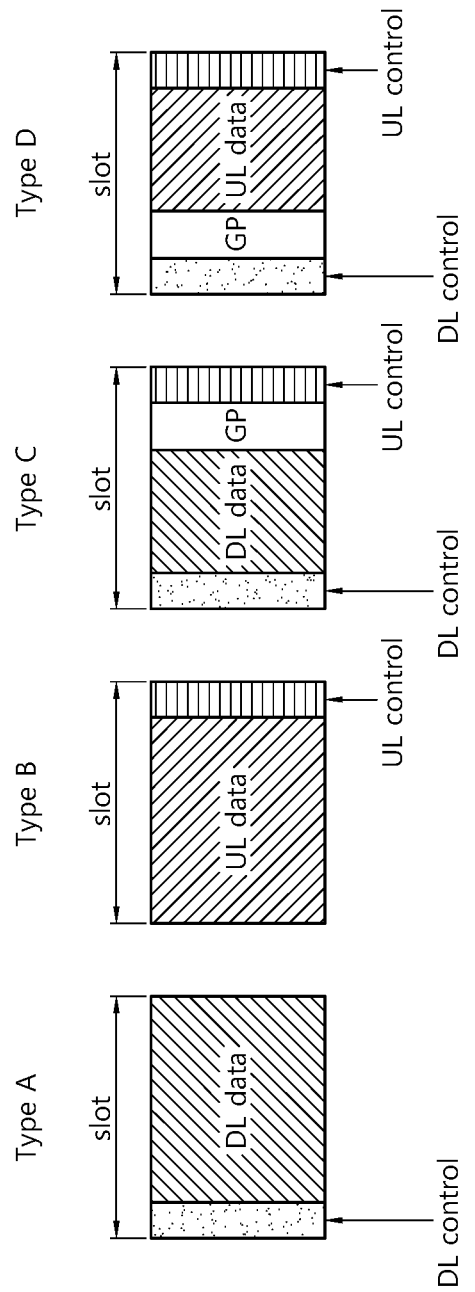
FIG. 7 schematically illustrates another example of a frame structure of the NR system.

The frame structure of the NR system described together with the example of FIG. 6 may be distinguished into 4 types as shown in FIG. 7, largely.

FIG. 7 schematically illustrates another example of a frame structure of the NR system.

Type A: DL control+DL data

That is, according to type A, a single slot (or frame) may be configured with a DL control region and a DL data region.

Type B: UL data+UL control

That is, according to type B, a single slot (or frame) may be configured with a UL data region and a UL control region. Here, the UL control may be dynamically omitted.

Type C: DL control+DL data+GP (guard period)+UL control

That is, according to type C, a single slot (or frame) may be configured with a DL control region, a DL data region, a guard period (GP) region and a UL control region.

Type D: DL control+GP+UL data+UL control

That is, according to type D, a single slot (or frame) may be configured with a DL control region, a GP region, a UL data region and a UL control region. Here, the positions of UL data and the UL control may be changed, or the UL control may be dynamically omitted.

<Analog Beamforming>

Since wavelength in the millimeter wave (mmW) band is very short, it becomes possible to install multiple antennas on the same area. In other words, in the 30 GHz band, the corresponding wavelength is about 1 cm, and a total of 100 antenna elements may be installed in a two dimensional array form on a panel of 5 cm×5 cm size with spacing of 0.5 lambda. Therefore, in the mmW band, multiple antenna elements may be used to improve the beamforming (BF) gain, thereby extending coverage or increasing throughput.

In this case, if a transceiver unit (TXRU) is used to allow adjustment of transmission power and phase for each antenna element, independent beamforming may be realized for each frequency resource. However, installing TXRUs in all of 100 or more antenna elements raises an effectiveness issue in terms of cost. Therefore, a method for mapping multiple antenna elements to one TXRU and adjusting a beam direction by using an analog phase shifter is being considered. However, this kind of analog beamforming (BF) method has a disadvantage that frequency selective BF is not possible because only one beam direction may be implemented over the whole band.

As an intermediate solution between digital BF and analog BF, hybrid BF employing B TXRUs, the number of which is smaller than the number of antenna elements, Q, may be taken into consideration. In this case, in spite of variations due to how B TXRUs are connected to Q antenna elements, the number of beam directions for simultaneous transmission may be limited below B.

Hereinafter, the present disclosure is described.

With the development of information and communication technologies, various wireless communication technologies are being developed. Wireless communication technologies are broadly classified into wireless communication technologies using licensed bands and wireless communication technologies using unlicensed bands (e.g., an industrial scientific medical (ISM) band). Since a licensed band is licensed exclusively to an operator, wireless communication technologies using the licensed band, may provide better reliability and better communication quality than wireless communication technologies that use unlicensed bands.

The long term evolution (LTE) and NR standards defined in the 3rd generation partnership project (3GPP) are representative wireless communication technologies using a licensed band. In the LTE communication network and NR, each of base stations and user equipment (UE) may transmit and receive signals through a license band.

The wireless local area network (WLAN) defined in Institute of Electrical and Electronics Engineers (IEEE) 802.11 is a representative wireless communication technology using an unlicensed band. In the WLAN communication network, each of an access point (AP) and stations (STA) may transmit and receive signals through an unlicensed band.

Recently, as mobile traffics are increasing explosively, additional licensed bands are required in order to process such the increasing mobile traffics through licensed bands. However, licensed bands are limited resources. Since a licensed band is obtained usually through an auction held among operators, astronomical investment may be demanded for obtaining an additional licensed band. In order to resolve the above-described problem, a method for providing LTE service or NR service through an unlicensed band may be considered.

Meanwhile, in an unlicensed band (U band), even in the case that a slot format is defined, the resources on which a UE operates may change every hour. In the case that a UE operates in a resource direction, it is good to perform an agreed operation with a network. However, a network is unable to know the time when a UE operates, a predefined agreement is required for a stable access in a U band.

In accordance with a predefined agreement, a UE may receive resource direction related information semi-statically or dynamically. An environment may be considered in which a semi-static resource direction transmitted in RRC may be defined by a semi-static D/U assignment, and a dynamic resource direction transmitted may be defined by SFI. In this case, SFI may inform a slot format for at least one slot. That is, SFI may inform slot formats for multiple slots from at least one slot.

The present disclosure provides a method for a base station to transmit information related to a slot format (i.e., SFI) to a UE. The following acronyms may be applied in the disclosure to be described below.

NCP: Normal CP
ECP: Extended CP
CP: Cyclic prefix
PDCCH: physical downlink control channel
DCI: downlink control information
CSI-RS: Channel State Information Reference Signal
SCS: Subcarrier spacing
SFI: Slot Format related Information
U band: unlicensed band
LBT: listen before talk
CORESET: Control resource set Here, a method for attaining a dynamic resource direction indication through SFI in a U band may be described in the aspects of 1. Slot format indication for unlicensed band, 2. Slot format definition method, 3. Slot format adoption timing, 4. Slot format scaling, 5. Priority rules for slot format related signals, 6. HARQ ACK resource for unlicensed band, 7. SFI related UE behavior, and 8. Semi-static D/U assignment via Dynamic SFI, and the method therefor is described with reference to drawings as below.

Figure 8:
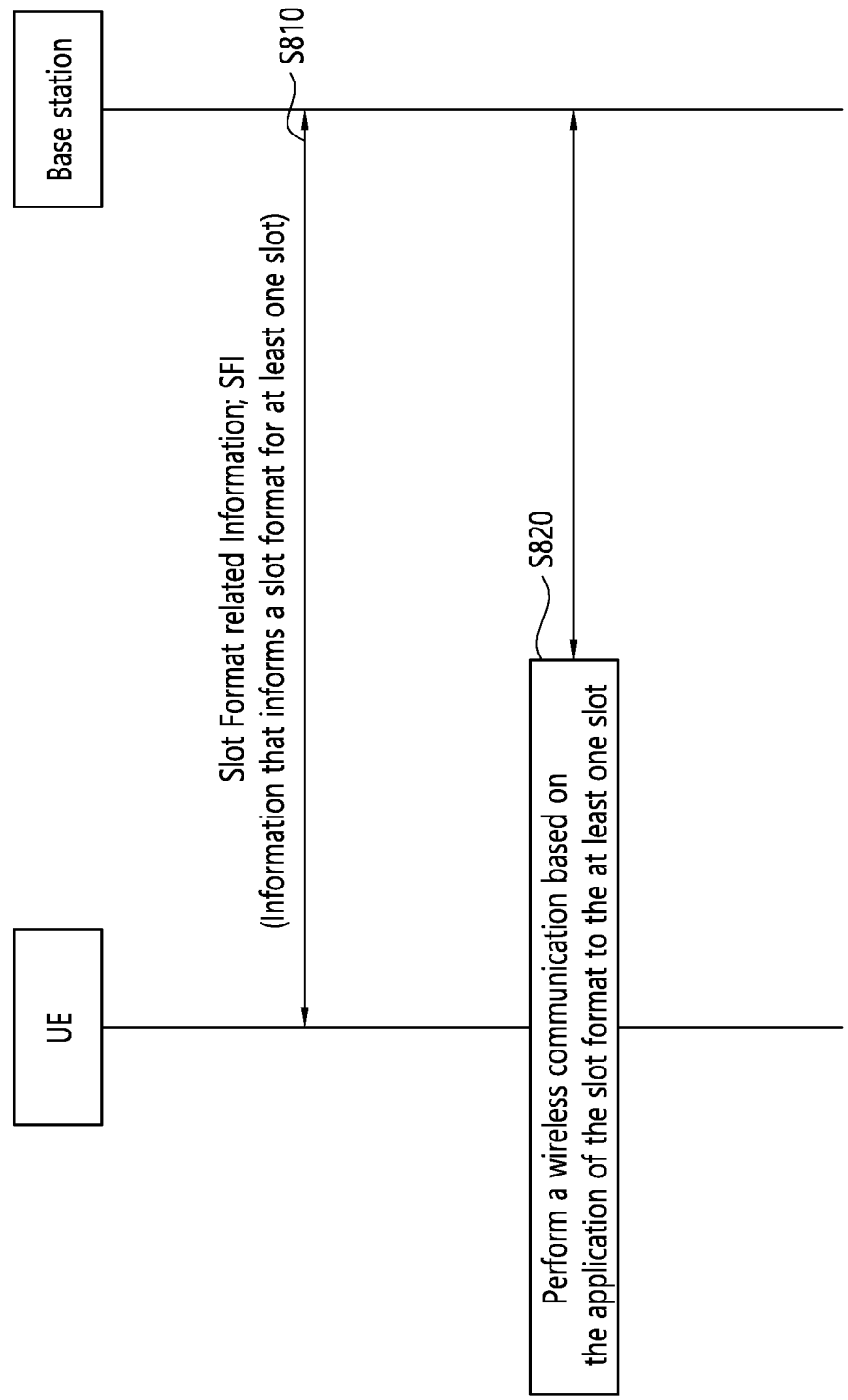
FIG. 8 is a flowchart of a method for transmitting slot format related information according to an embodiment of the present disclosure.

FIG. 8 is a flowchart of a method for transmitting slot format related information according to an embodiment of the present disclosure.

Referring to FIG. 8, a base station may transmit Slot Format related Information (SFI) to a UE (step, S810). In this case, the Slot Format related Information may be information that informs a slot format for at least one slot, as described above.

Here, an example for a slot format may be as represented in Table 1 below. The slot format in this case may correspond to a slot format in a normal CP, for example.

TABLE 1

| for- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | F | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |

TABLE 1-continued

| for- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | F | F | F | F | F | F | U | U | U |
| 45 | D | D | D | D | D | F | F | U | U | U | U | U | U | U |
| 46 | D | D | D | D | F | U | D | D | D | D | D | F | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | F | F | U | U | U | U |
| 51 | D | F | U | U | U | U | U | D | F | U | U | U | U | U |
| 52 | D | F | F | F | F | U | D | F | F | F | F | F | F | U |
| 53 | D | D | F | F | F | U | D | D | F | F | F | F | F | U |
| 54 | F | F | F | F | F | F | D | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

In Table 1, 'D' means a downlink symbol, 'U' means an uplink symbol, and 'F' means a flexible symbol.

In addition, the Semi-static D/U assignment may be control information having the same as or similar to TDD-UL-DL-ConfigrationCommon or TDD-UL-DL-ConfigDedicated.

For the convenience of understanding, slot formats are described based on Table 1 below. For example, in the case of slot format 0, all symbols existed in a slot (i.e., symbol 0 to symbol 13) may mean downlink symbols. In addition, for example, in the case of slot format 1, all symbols existed in a slot may mean uplink symbols. As another example, in the case of slot format 55, symbol 0, symbol 1 and symbol 8 to symbol 13 may be downlink symbols, symbols 2 to symbols 4 may be flexible symbols, and symbol 5 to symbol 7 may be uplink symbols.

When a base station transmits slot format related information to a UE, for example, the SFI may be transmitted in every predetermined slot number or in every predetermined time (or a transmission may be attempted in every predetermined slot number or in every predetermined time). A specific example for the transmission of SFI (or an attempt to transmit) in every predetermined slot number or in every predetermined time may be as described below.

1. Slot Format Indication for Unlicensed Band

Even in the case that a slot format is defined in the aspect of a base station (e.g., gNB), it is unexpectable when the slot format is transferred to a UE. Since the base station does not know a time when a resource for transmitting SFI is available after LBT or sensing, the base station may have a difficulty in defining a slot format.

In order to resolve it, the following options may be considered.

Option 1-1: A base station (e.g., gNB) may attempt to transmit SFI in every slot.

Option 1-2: A base station (e.g., gNB) may attempt to transmit SFI in every slot. For this, a base station (e.g., gNB) may may define a minimum of downlink resource for SFI transmission in every slot.

Option 2-1: A base station (e.g., gNB) may attempt to transmit SFI in every predetermined slot number (e.g., 1, 2, 4, 5, 8, 10, 20, 40 slots or PDCCH monitoring period) or predetermined time (e.g., 0.5, 0.625, 1, 1.25, 1.5, 1.625, 2, 4, 5, 10, 20, 40 ms or available period of semi-static D/U assignment).

In this case, if a base station is unable to transmit SFI on a slot or time for scheduled transmission, the base station may attempt to transmit SFI in a downlink resource available for SFI transmission in a defined slot format persistently.

Option 2-2: A base station (e.g., gNB) may attempt to transmit SFI in every predetermined slot number (e.g., 1, 2, 4, 5, 8, 10, 20, 40 slots or PDCCH monitoring period) or predetermined time (e.g., 0.5, 0.625, 1, 1.25, 1.5, 1.625, 2, 4, 5, 10, 20, 40 ms or available period of semi-static D/U assignment).

For Option 2-2, a base station (e.g., gNB) may define a minimum of downlink resource for SFI transmission always in every predefined slot or predetermined time above. That is, a downlink resource for SFI transmission transmitted in every predefined slot or predetermined time may be always defined. Alternatively, a downlink resource for SFI transmission transmitted in every predefined slot or predetermined time may be always existed.

In this case, if a base station is unable to transmit SFI on a scheduled slot or a scheduled time, the base station may attempt to transmit SFI in a downlink resource available for SFI transmission in a defined slot format persistently.

Meanwhile, the way of defining a slot format may be an issue. A specific example for a method for defining a slot format may be as described below.

2. Slot Format Definition Method

As a method for defining a slot format, a base station (e.g., gNB) may consider the following options. Here, the number of slots or times on which slot formats may be defined at a time may be predetermined or preconfigured, and in this case, the number of a predetermined slot number may be 1, 2, 4, 5, 8, 10, 20, 40 slots or a PDCCH monitoring period, for example. Alternatively, in the case, the predetermined time may be 0.5, 0.625, 1, 1.25, 1.5, 1.625, 2, 4, 5, 10, 20, 40 ms or an available period of semi-static D/U assignment, for example.

Option 1: When transferring SFI after LBT or sensing is finished, a base station (e.g., gNB) may define a slot format from the time of applying the slot format to an SFI defined limit slot/time.

Option 2: Without regard to LBT or sensing, a base station (e.g., gNB) may have a predetermined period slot/time available for defining a slot format and may define a slot format for the corresponding period slot/time.

Thereafter, a UE may perform a wireless communication based on the application of the slot format to the at least one slot (step, S820). That is, after applying the slot format for each slot based on the received SFI, the UE may perform an uplink communication on an uplink symbol in a specific slot and perform a downlink communication on a downlink symbol depending on the applied slot format.

In this case, for example, in the case that a slot format is transferred by SFI, it may be problematic from which slot the UE applies the received SFI, and the specific solution for this is as described below.

3. Slot Format Adoption Timing

In the case that a slot format is transferred by SFI, for a slot on which the corresponding slot format is applied, a UE may operate as below.

Option 1: Apply a slot format from the slot on which SFI is transferred

Option 2: Apply a slot format from the next slot after the slot on which SFI is received Option 3: Apply a slot format from the second slot after the slot on which SFI is received Option 4: Apply a slot format from the third slot after the slot on which SFI is received Option 5: Apply by receiving a configuration of an offset value indicating the order of slot format after the slot on which SFI is received from a base station (e.g., gNB)

That is, the UE may apply the slot format from the slot on which SFI is received or apply the slot format from the $N^{th}$ slot after the slot on which SFI is received, the N is a positive integer. At this time, in the case that the UE applies the slot format from the $N^{th}$ slot after the slot on which SFI is received, the UE may also receive an offset value for the N from the base station.

Meanwhile, in the case that the time when the UE receives the SFI is a middle time among the slots on which the slot format is defined, it may be problematic from which time the UE applies the slot format and to which time the UE applies the slot format. Accordingly, hereinafter, a slot format scaling is described.

4. Slot Format Scaling

In the case that a slot format is defined according to Option 2 of 2. Slot format definition method, the time when a UE actually receives SFI may not be a starting time of the slot format, but a middle time among the slots on which the slot format is defined.

That is, a slot format is defined for 10 slots, for example, but a UE may receive a slot format for 10 slots from the middle, for example, the third slot.

In this case, a boundary on which the slot format is determined may be specifically defined or configured in a predetermined slot interval or a predetermined time interval. Here, the predetermined slot number may be 1, 2, 4, 5, 8, 10, 20, 40 slot(s) or a PDCCH monitoring period, for example. Alternatively, the predetermined time may be 0.5, 0.625, 1, 1.25, 1.5, 1.625, 2, 4, 5, 10, 20, 40 ms or an available period of semi-static D/U assignment, for example.

Meanwhile, as a slot format application time, one of the options of 3. Slot format adoption timing may be selected.

A specific example for the slot format scaling may be as described below.

Option 1: Apply a received slot format from the first

For example, in the case that a slot format for 10 slots is received, a UE applies the received slot format for 10 slots from the time of applying the slot format.

Option 2: Apply the slot format from the order of slot on which SFI is received to the remaining slots That is, in the case that a time when the UE receives the SFI is a middle time of the slots on which the slot format is defined, the UE may apply the slot format from the slot on which the SFI is received to the remaining slots on which the slot format is defined.

For example, in the case that the slot format for 10 slots is received from the fourth slot from the slot that should be originally received, a UE may apply only the slot format corresponding to 4 to 10 slots from the slot format application time.

Meanwhile, in the example shown in FIG. 8, the following methods may be applied.

5. Priority Rules for Slot Format Related Signals

Since a U band availability is dynamically changed, a slot format in a U band may be dynamically indicated due to the characteristics of the band.

Even in the case that a semi-static resource direction is defined by a semi-static D/U assignment, the corresponding resource may not be used depending on LBT or sensing result due to the characteristics of a U band.

Eventually, a resource direction needs to be dynamically defined, but in the case that the direction of a resource semi-statically defined cannot be changed, it is hard to use a U band resource freely.

Therefore, a dynamic resource direction change through SFI may be considered in a U band.

In addition, it is required to change even a direction defined by a configuration involved in a semi-static D/U assignment or different resource direction with SFI. For example, this may be arranged as below.

Option 1: Dynamic SFI may define an opposite or different resource direction for the resource direction defined by a semi-static D/U assignment.

Option 2: Dynamic SFI may define an opposite or different resource direction for the resource direction defined by a scheduling DCI.

Option 3: Dynamic SFI may define an opposite or different resource direction for SSB or RACH resource defined with RMSI.

Option 4: Dynamic SFI may define an opposite or different resource direction for the resource defined by an RRC configuration.

6. HARQ ACK Resource for Unlicensed Band

In an Unlicensed band (U band), it may be meaningless to define ACK/NACK resource explicitly.

For example, even in the case that a resource is secured in advance, a D/U transmission to the resource is unavailable, and accordingly, it is impossible to anticipate whether a base station (e.g., gNB) or a UE is available for a transmission.

If ACK/NACK transmission is defined with a predetermined rule, not explicitly defined, the problem described above may be resolved.

Option 1: In the case that a UE is unable to transmit ACK/NACK since the UE determines that the resource to transmit ACK/NACK is unusable by LBT or sensing a U band, the UE may abandon the ACK/NACK transmission.

Option 2: In the case that a UE is unable to transmit ACK/NACK since the UE determines that the resource to transmit ACK/NACK is unusable by LBT or sensing a U band, the UE transmits only the resource of which slot format is indicated to the fastest available uplink resource. In the case that ACK/NACK is unable to be transmitted in the resource of which slot format is indicated, the UE abandons the ACK/NACK transmission.

Option 3: In the case that a UE is unable to transmit ACK/NACK since the UE determines that the resource to transmit ACK/NACK is unusable by LBT or sensing a U band, and in the case that the transmission is failed even in the resource of which slot format is indicated, the UE transmits ACK/NACK to the next available uplink resource.

Option 4: In the case that a UE is unable to transmit ACK/NACK since the UE determines that the resource to transmit ACK/NACK is unusable by LBT or sensing a U band, the UE transmits ACK/NACK to the fastest available uplink resource in a predetermined slot number (e.g., 1, 2, 4, 5, 8, 10, 20, 40 slots or PDCCH monitoring period) or a predetermined time (e.g., 0.5, 0.625, 1, 1.25, 1.5, 1.625, 2, 4, 5, 10, 20, 40 ms or available period of semi-static D/U assignment).

The predetermined slot number or the predetermined time may be configured from a network. In the case that ACK/NACK is unable to be transmitted in the predetermined slot number or the predetermined time, the UE abandons the ACK/NACK transmission.

7. SFI Related UE Behavior

In the situation that a certain resource direction is indicated before receiving SFI or a resource direction is defined by a configuration by RMSI or RRC (e.g., SSB, RACH, CSI-RS, CSR reporting, Grant-free resource, UE-specific RACH, etc.), in the case that SFI is not received in the point on which SFI is originally received, but received on the time when LBT or sensing is succeeded, it is required to define an operation of UE for the time of LBT or sensing.

Option 1: In the case that a UE is configured to receive dynamic SFI, but unable to receive the SFI, the UE performs the operation predefined by RRC or a higher layer signal without any change.

Option 2: In the case that a UE is configured to receive dynamic SFI, but unable to receive the SFI, the UE stops all operations predefined by RRC or a higher layer signal.

Option 3: In the case that a UE is configured to receive dynamic SFI, but unable to receive the SFI, the UE stops all operations predefined by RRC or a higher layer signal. However, the UE performs CORESET monitoring.

8. Semi-Static D/U Assignment Via Dynamic SFI

Since a transfer period of a semi-static D/U assignment is long, in the case that a UE fails to receive a semi-static assignment, the UE may have to wait for a long time until receiving semi-static D/U direction information again. Instead, this information may be transmitted with dynamic SFI in a slot format.

That is, the dynamic SFI may transfer slot format information including symbol direction information defined due to a semi-static D/U assignment.

Of course, a single dynamic SFI may not include the whole semi-static D/U assignment information, but the slot format transferred by the dynamic SFI may be the same as the semi-static D/U assignment in the least or inform an additional direction for a semi-static flexible. Except the case that a network does not transmit the dynamic SFI intentionally, the he dynamic SFI may be the same as the semi-static D/U assignment in the least or may have more symbol direction information.

Since the examples for the proposed methods described above may be included as one of the implementation methods of the inventive concept, it is apparent that the examples may be regarded as a type of proposed methods. In addition, the proposed methods may be independently implemented, but may also be implemented in a combination (or merge) form. A rule may be defined such that a base station informs information on whether to apply the proposed methods (or information on rules of the proposed methods) to a UE through a predefined signal (e.g., a physical layer signal or a higher layer signal).

The description with reference to FIG. 8 above may also be described in the aspect of a UE as below.

Figure 9:
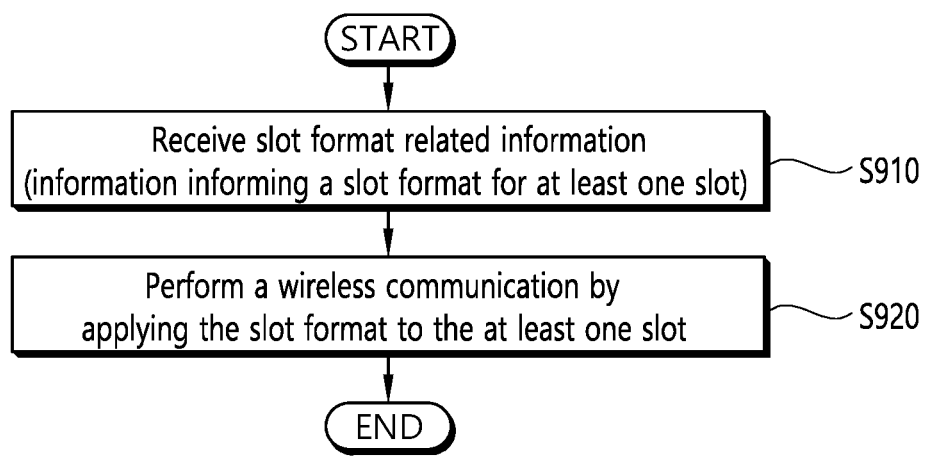
FIG. 9 is a flowchart of a method for receiving information related to a slot format in the aspect of a UE according to an embodiment of the present disclosure.

FIG. 9 is a flowchart of a method for receiving information related to a slot format in the aspect of a UE according to an embodiment of the present disclosure.

Referring to FIG. 9, a UE may receive slot format related information (information informing a slot format for at least one slot) (step, S910). Here, since the specific example for a UE to receive the slot format related information is as described above, the repeated description on the same contents is not provided.

Thereafter, the UE may perform a wireless communication by applying the slot format to the at least one slot (step, S920). Here, since the specific example for a UE to perform a wireless communication by applying the slot format to the at least one slot is as described above, the repeated description on the same contents is not provided.

Figure 10:
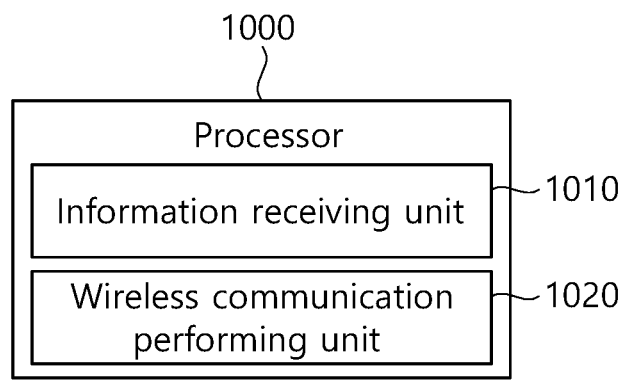
FIG. 10 is a block diagram for an example of a reception apparatus of information related to a slot format in the aspect of a UE according to an embodiment of the present disclosure.

FIG. 10 is a block diagram for an example of a reception apparatus of information related to a slot format in the aspect of a UE according to an embodiment of the present disclosure.

Referring to FIG. 10, a processor 1000 may include an information receiving unit 1010 and a wireless communication performing unit 1020. Here, the processor 1000 may mean the processor of a UE shown in FIG. 13 to FIG. 19 to be described below.

The information receiving unit 1010 may receive slot format related information (information informing a slot format for at least one slot). Here, since the specific example for a UE to receive the slot format related information is as described above, the repeated description on the same contents is not provided.

The wireless communication performing unit 1020 may perform a wireless communication by applying the slot format to the at least one slot. Here, since the specific example for a UE to perform a wireless communication by applying the slot format to the at least one slot is as described above, the repeated description on the same contents is not provided.

The description with reference to FIG. 8 above may also be described in the aspect of a base station as below.

Figure 11:
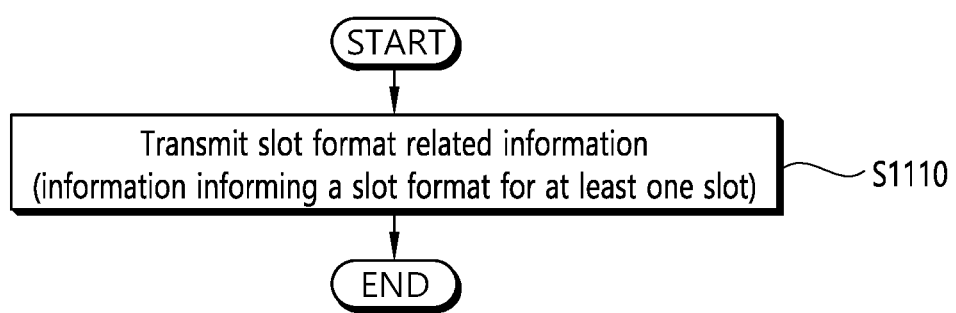
FIG. 11 is a flowchart of a method for receiving information related to a slot format in the aspect of a base station according to an embodiment of the present disclosure.

FIG. 11 is a flowchart of a method for receiving information related to a slot format in the aspect of a base station according to an embodiment of the present disclosure.

Referring to FIG. 11, a base station may transmit slot format related information (information informing a slot format for at least one slot) (step, S1110). Here, since the specific example for a base station to transmit the slot format related information is as described above, the repeated description on the same contents is not provided.

Figure 12:
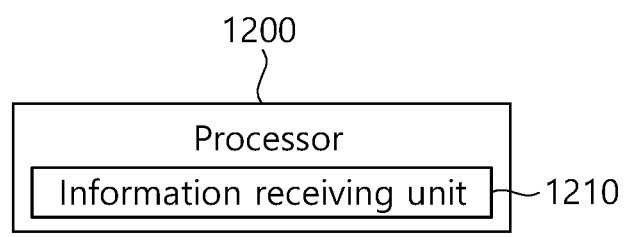
FIG. 12 a block diagram for an example of a reception apparatus of information related to a slot format in the aspect of a base station according to an embodiment of the present disclosure.

FIG. 12 a block diagram for an example of a reception apparatus of information related to a slot format in the aspect of a base station according to an embodiment of the present disclosure.

Referring to FIG. 12, a processor 1200 may include an information transmitting unit 1210. Here, the processor 1200 may mean the processor of a UE shown in FIG. 13 to FIG. 19 to be described below.

The information receiving unit 1210 may transmit slot format related information (information informing a slot format for at least one slot). Here, since the specific example for a base station to transmit the slot format related information is as described above, the repeated description on the same contents is not provided.

Figure 13:
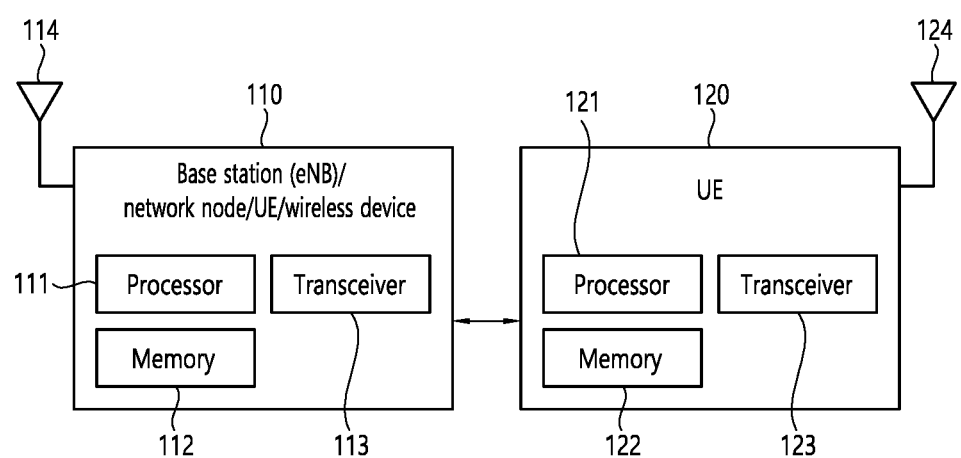
FIG. 13 is a block diagram of a wireless communication device according to an embodiment of the present disclosure.

FIG. 13 is a block diagram of a wireless communication device according to an embodiment of the present disclosure.

Referring to FIG. 13, a wireless communication system may comprise a base station 110 and a UE 120. The UE 120 may be located within coverage of the base station 110. In some use scenario, the wireless communication system may include a plurality of UEs. The example of FIG. 13 includes the base station 110 and the UE 120, but the present disclosure is not limited to the specific arrangement. For example, the base station 110 may be replaced with another network node, a UE, a wireless device, or any other entity similar to the base station 110.

The base station and the UE may represent a wireless communication device or a wireless device, respectively. The base station of FIG. 13 may be replaced with a network node, a wireless device, or a UE.

The base station 110 may include at least one processor such as the processor 111, at least one memory such as the memory 112, and at least one transceiver such as the transceiver 113. The processor 111 may perform the aforementioned functions, procedures, and/or methods shown in FIGS. 6 to 11. The processor 111 may perform one or more protocols. For example, the processor 111 may perform one or more layers (for example, functional layer) of a radio interface protocol. The memory 112 may be coupled to the processor 111 and may store various types of information and/or commands. The transceiver 113 may be coupled to the processor 111 and may be controlled to transmit and receive a radio signal.

The UE 120 may include at least one processor such as the processor 121, at least one memory such as the memory 122, and at least one transceiver such as the transceiver 123.

The processor 121 may perform the aforementioned functions, procedures, and/or methods shown in FIGS. 9 to 18. The processor 121 may perform one or more protocols. For example, the processor 121 may perform one or more layers (for example, functional layer) of a radio interface protocol. The memory 122 may be coupled to the processor 121 and may store various types of information and/or commands. The transceiver 123 may be coupled to the processor 121 and may be controlled to transmit and receive a radio signal.

The memory 112 and/or the memory 122 may be connected internally or externally to the processor 111 and/or the processor 121, respectively or may be connected to other processors through various techniques such as wired or wireless connections.

The base station 110 and/or the UE 120 may have one or more antennas. For example, the antenna 114 and/or the antenna 124 may be configured to transmit and receive a radio signal.

Figure 14:
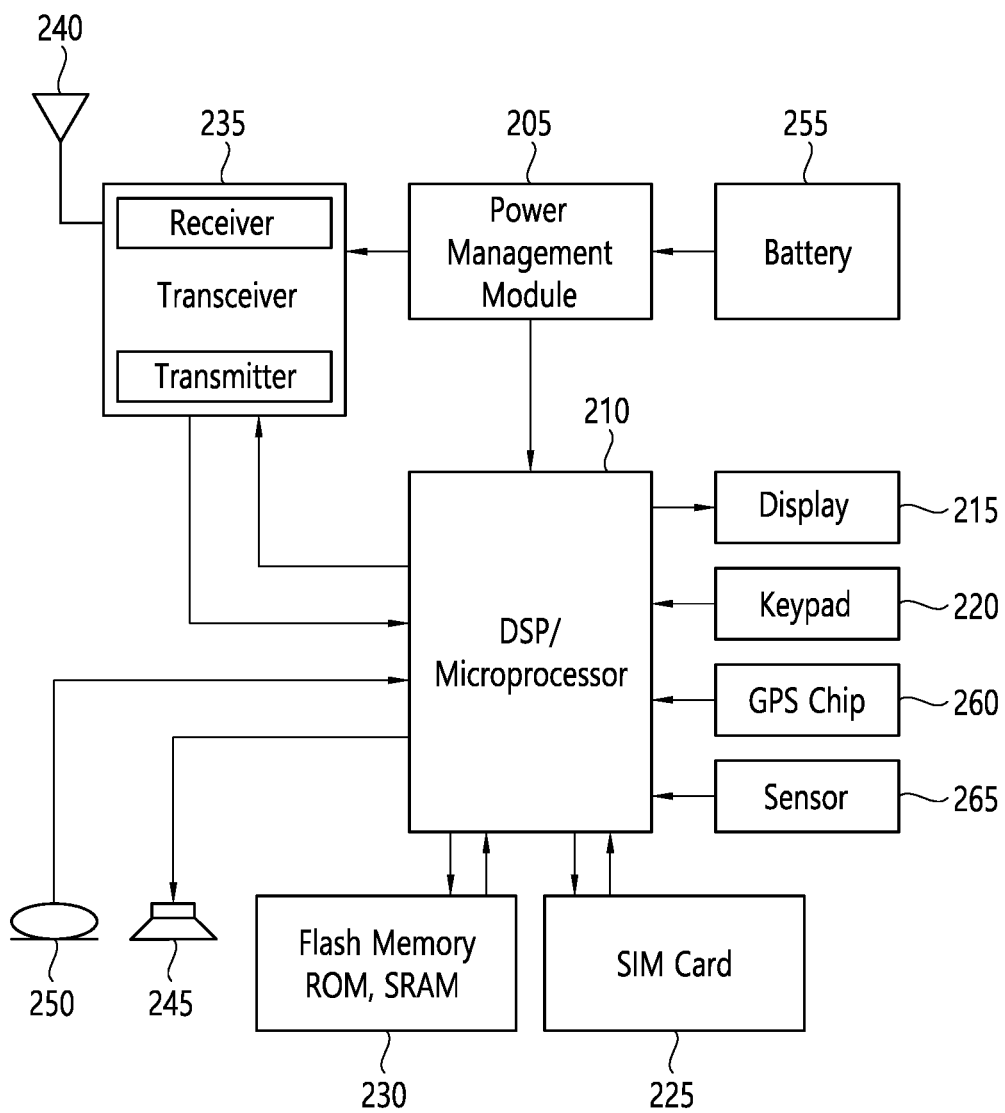
FIG. 14 is one example of a wireless communication device in which an embodiment of the present disclosure is implemented.

FIG. 14 is one example of a wireless communication device in which an embodiment of the present disclosure is implemented.

In particular, FIG. 14 illustrates the UE 100 of FIG. 13 in more detail. Like a vehicle communication system or device, a wearable device, a portable computer, or a smartphone, the UE may be a mobile computing device of arbitrary type configured suitably to perform one or more implementations of the present disclosure.

Referring to FIG. 14, the UE may comprise at least one processor such as the processor 210 (for example, a DSP or a microprocessor), a transceiver 235, a power management module 205, an antenna 240, a battery 255, a display 215, a keypad 220, a GPS chip 260, a sensor 265, a memory 230, a Subscriber Identification Module (SIM) card 225 (this element may be optional), a speaker 245, and a microphone 250. The UE may also include one or more antennas.

The processor 210 may be configured to perform the functions, processes and/or methods described with reference to FIGS. 11 to 15. Depending on the implementation example, the processor 210 may perform one or more protocols in conjunction with the layers of a radio interface protocol (for example, functional layers).

The memory 230 is connected to the processor 210 and stores information related to the operation of the processor 210. The memory may be installed inside or outside the processor and may be connected to other processors through various techniques such as wired or wireless connections.

A user may input various types of information (for example, command information such as a phone number) by pressing buttons of the keypad 220 or using various techniques such as voice activation using the microphone 250. The processor receives and processes the command information of the user and performs a proper function such as calling the phone number. As one example, data (for example, operational data) may be retrieved from the SIM card 225 or the memory 230 to perform functions. As another example, the processor may receive and process GPS information from the GPS chip 260 to perform a function associated with the position of the device, such as vehicle navigation and a map service. As yet another example, the processor may display various types of information and data on the display 215 for the reference or convenience of the user.

The transceiver 235 is connected to the processor and transmits and receives a radio signal such as a Radio Frequency (RF) signal. The processor may control the transceiver to initiate communication and transmit a radio signal including various types of information or data such as voice communication data. The transceiver includes one receiver and one transceiver to transmit or receive radio signals. The antenna 240 facilitates transmission and reception of radio signals. Depending on implementation, the transceiver may forward and convert radio signals to baseband signals to involve the processor in receiving the signals. The processed signals may be transformed by various techniques into the information that may be output and heard through the speaker 245 or into readable information.

Depending on implementation, the sensor 265 may be connected to the processor. The sensor may include one or more detection devices configured to detect various forms of information including but not limited to velocity, acceleration, light, vibration, proximity, position, and image. The processor may receive and process sensor information obtained from the sensor and perform various forms of functions such as collision prevention and automated driving.

In the example of FIG. 14, various constituting elements (for example, a camera or a USB port) may be additionally included in the UE. For example, the camera may be connected to the processor and used for various services such as automated driving and vehicle safety service.

As described above, FIG. 14 is only an example, and implementation is not limited to the specific example. For example, a few of constituting elements (for example, the keypad 220, the GPS chip 260, the sensor 265, the speaker 245 and/or the microphone 250) may not be implemented for a particular scenario.

Figure 15:
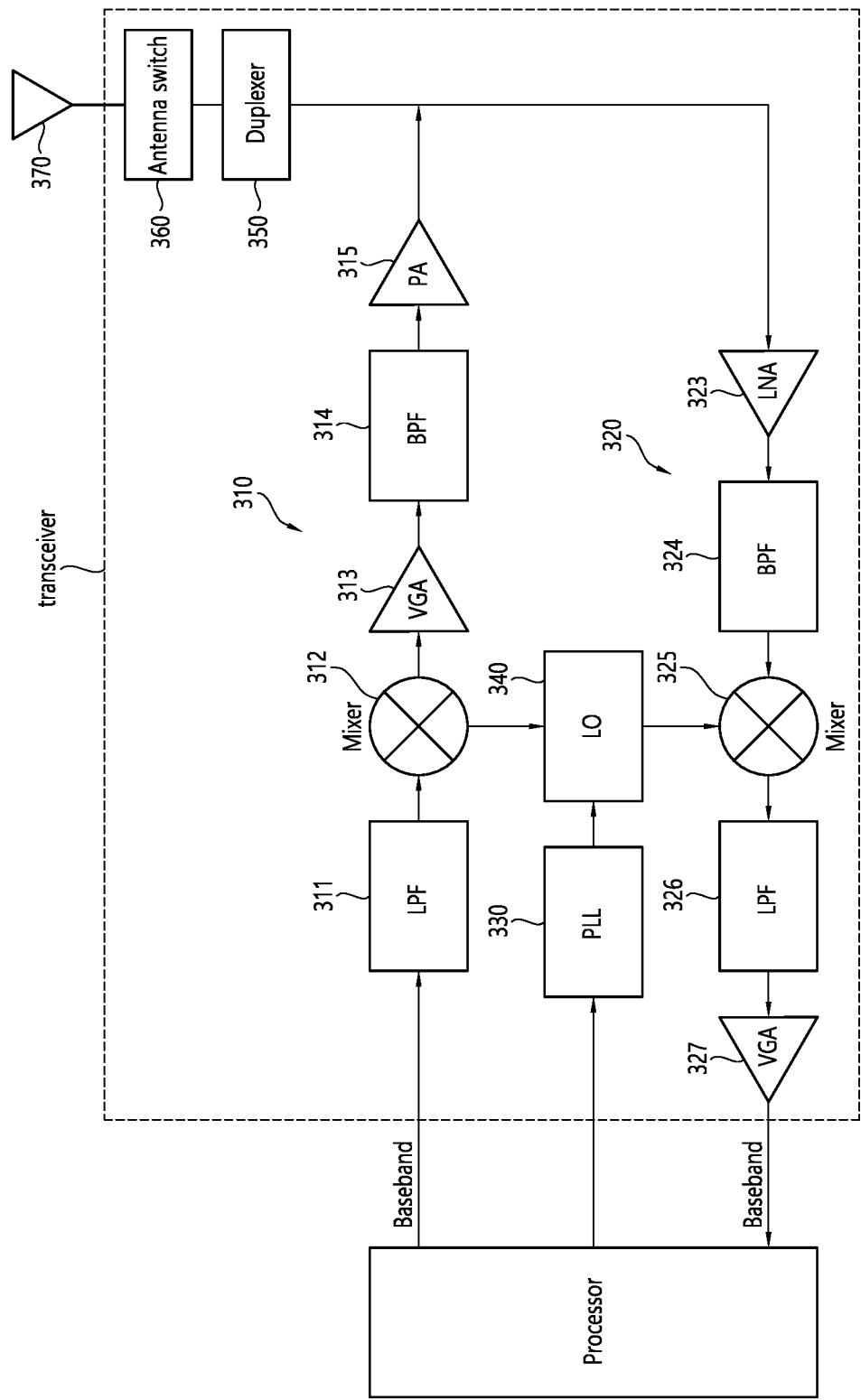
FIG. 15 illustrates an example of a transceiver of a wireless communication device according to an embodiment of the present disclosure.

FIG. 15 illustrates an example of a transceiver of a wireless communication device according to an embodiment of the present disclosure.

In particular, FIG. 15 illustrates an example of a transceiver that may be implemented in a frequency division duplex (FDD) system.

On the transmission path, like the processor described in FIGS. 13 and 14, at least one processor may process data to be suitable for transmission and forward a signal such as an analog output signal to the transmitter 310.

According to the example above, in the transmitter 310, an analog output signal is filtered by the low-pass filter (LPF) 311, for example, to remove noise due to digital-to-analog conversion (ADC) in the previous stage, up-converted from a baseband frequency to an RF frequency by an up-converter (for example, the mixer) 312, and amplified by an amplifier such as the variable gain amplifier (VGA) 313. The amplified signal is filtered by the filter 314, amplified by the power amplifier (PA) 315, routed through duplexer(s) 350/antenna switch(es) 360 and transmitted through the antenna 370.

On the reception path, the antenna 370 receives a signal in a radio environment, and received signals are routed by the antenna switch(es) 360/duplexer(s) 350 and forwarded to the receiver 320.

In the example above, a signal received by the receiver 320 is amplified by an amplifier such as the low noise amplifier (LNA) 323, filtered by the bandpass filter 324, and down-converted from the RF frequency to the baseband frequency by the down-converter (for example, mixer) 325. The down-converted signal is filtered by the lowpass filter (LPF) 326, amplified by an amplifier such as the VGA 327 to obtain an analog input signal, where the analog input signal is provided to one or more processors such as the processors of FIGS. 14 and 15.

Furthermore, the local oscillator (LO) 340 generates LO signals for transmission and reception and provides the LO signals to the up-converter 312 and the down-converter 325, respectively.

In some implementation, the phase-locked loop (PLL) 330 may receive control information from the processor and send control signals to the LO generator 340 to generate LO signals for transmission and reception at appropriate frequencies.

The implements are not limited to the specific arrangement as shown in FIG. 15, and various constituting elements and circuits may be arranged differently from the example of FIG. 15.

Figure 16:
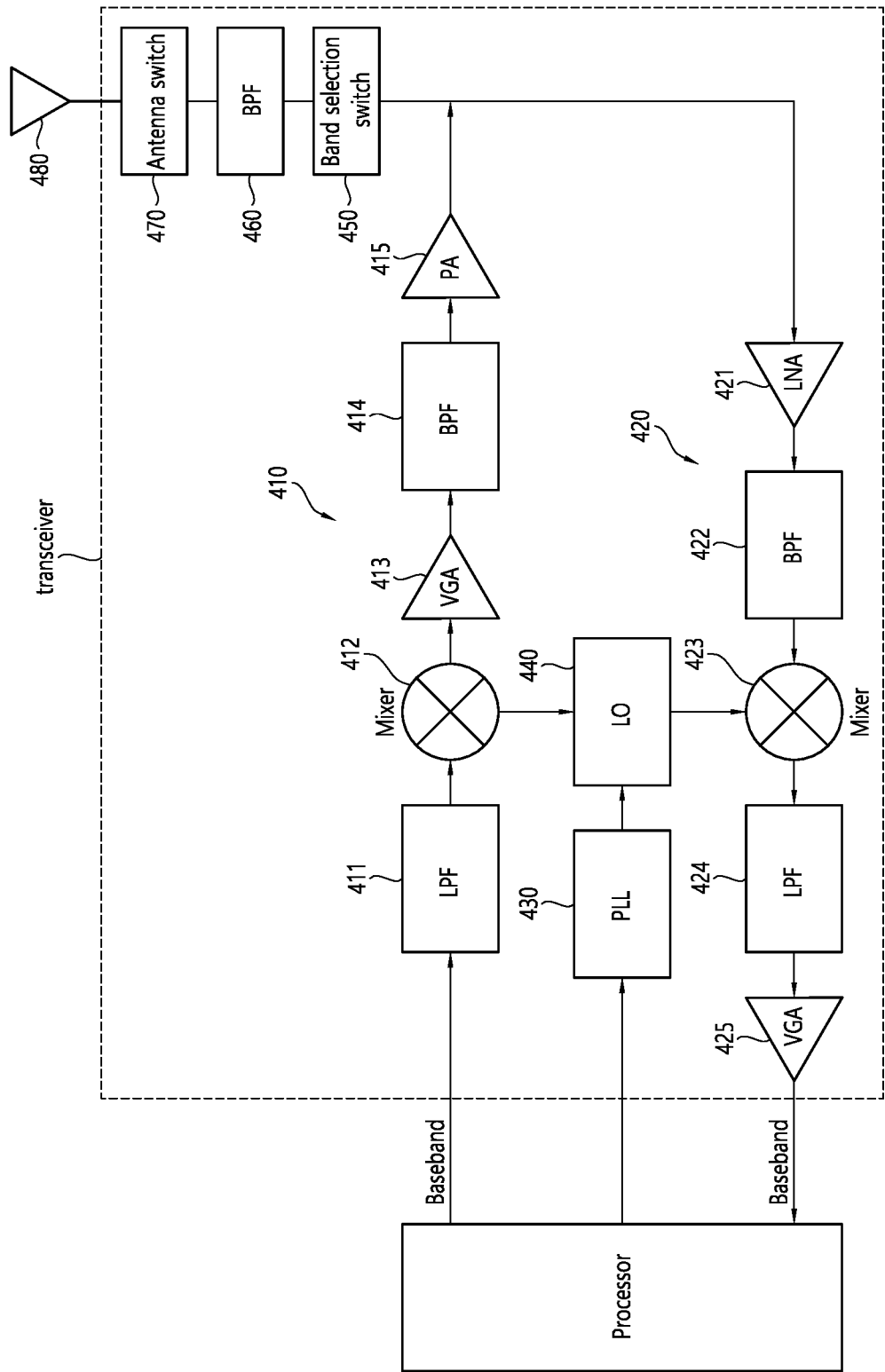
FIG. 16 illustrates another example of a transceiver of a wireless communication device according to an embodiment of the present disclosure.

FIG. 16 illustrates another example of a transceiver of a wireless communication device according to an embodiment of the present disclosure.

In particular, FIG. 16 illustrates an example of a transceiver that may be implemented in a time division duplex (TDD) system.

According to the implementation, the transmitter 410 and the receiver 420 of the transceiver of the TDD system may have one or more properties similar to the transmitter and the receiver of the transceiver of the FDD system.

In what follows, the structure of the transceiver of the TDD system will be described.

On the transmission path, a signal amplified by the power amplifier (PA) 415 of the transmitter is routed through the band selection switch 450, bandpass filter (BPF) 460, and antenna switch(es) 470, and forwarded to the antenna.

On the reception path, the antenna 480 receives signals in a radio environment, where the received signals are routed through the antenna switch(es) 470, bandpass filter (BPF) 460, and band selection switch 450 to be provided to the receiver 420.

Figure 17:
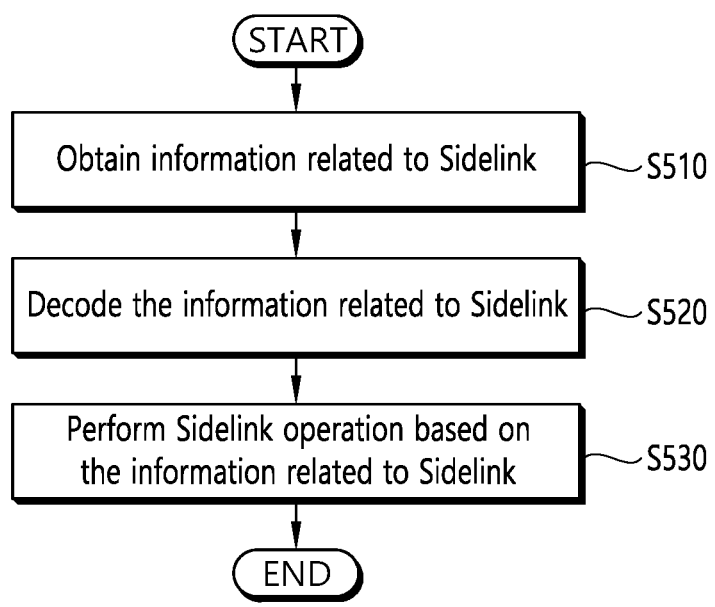
FIG. 17 illustrates operations of a wireless device related to wireless communication.

FIG. 17 illustrates operations of a wireless device related to wireless communication.

The wireless device operations related to wireless communication described in FIG. 17 are only an example, and wireless communication operations using various techniques may be performed in the wireless device. For wireless communication, various forms of information may be delivered.

In the example above, the wireless device obtains information related to wireless communication S510. Information related to wireless communication may be one or more resource configurations. Information related to wireless communication may be obtained from another wireless device or from a network node.

After obtaining information, the wireless device decodes information related to wireless communication S520.

After decoding information related to wireless communication, the wireless device performs one or more wireless communication operations based on the information related to wireless communication S530. Here, the wireless communication operation(s) performed by the wireless device may correspond to one or more operations described herein.

Figure 18:
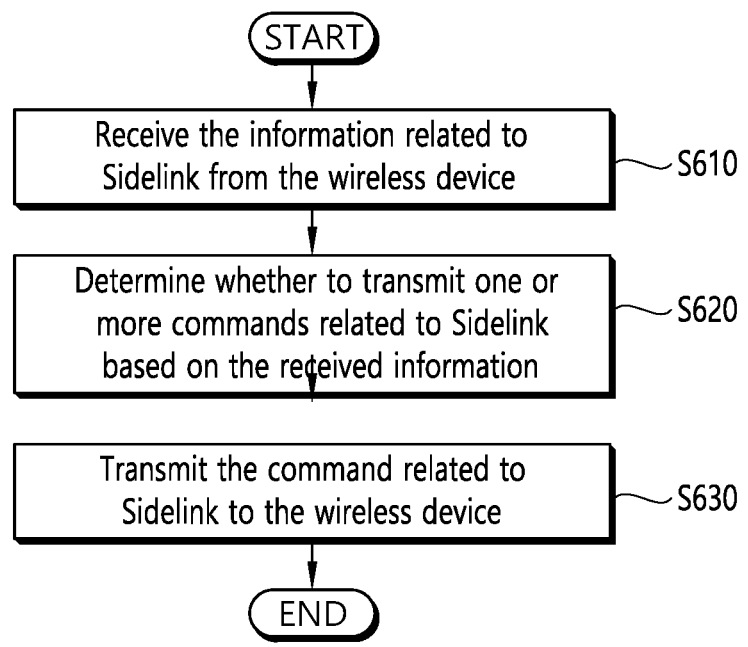
FIG. 18 illustrates an example of a network node operation related to wireless communication.

FIG. 18 illustrates an example of a network node operation related to wireless communication.

The network node operations related to wireless communication described in FIG. 18 are only an example, and wireless communication operations using various techniques may be performed in the network node.

The network node receives information on wireless communication from the wireless device S610. For example, information related to wireless communication may indicate information used to inform the network node of wireless communication information.

After receiving the information, the network node determines, based on the received information, whether to transmit one or more commands related to wireless communication S620.

According to the decision of the network node to transmit a command, the network node transmits a command(s) related to wireless communication to the wireless device S630. Depending on the implementation, after receiving a command transmitted by the network node, the wireless device may perform one or more wireless communication operation(s) based on the received command.

Figure 19:
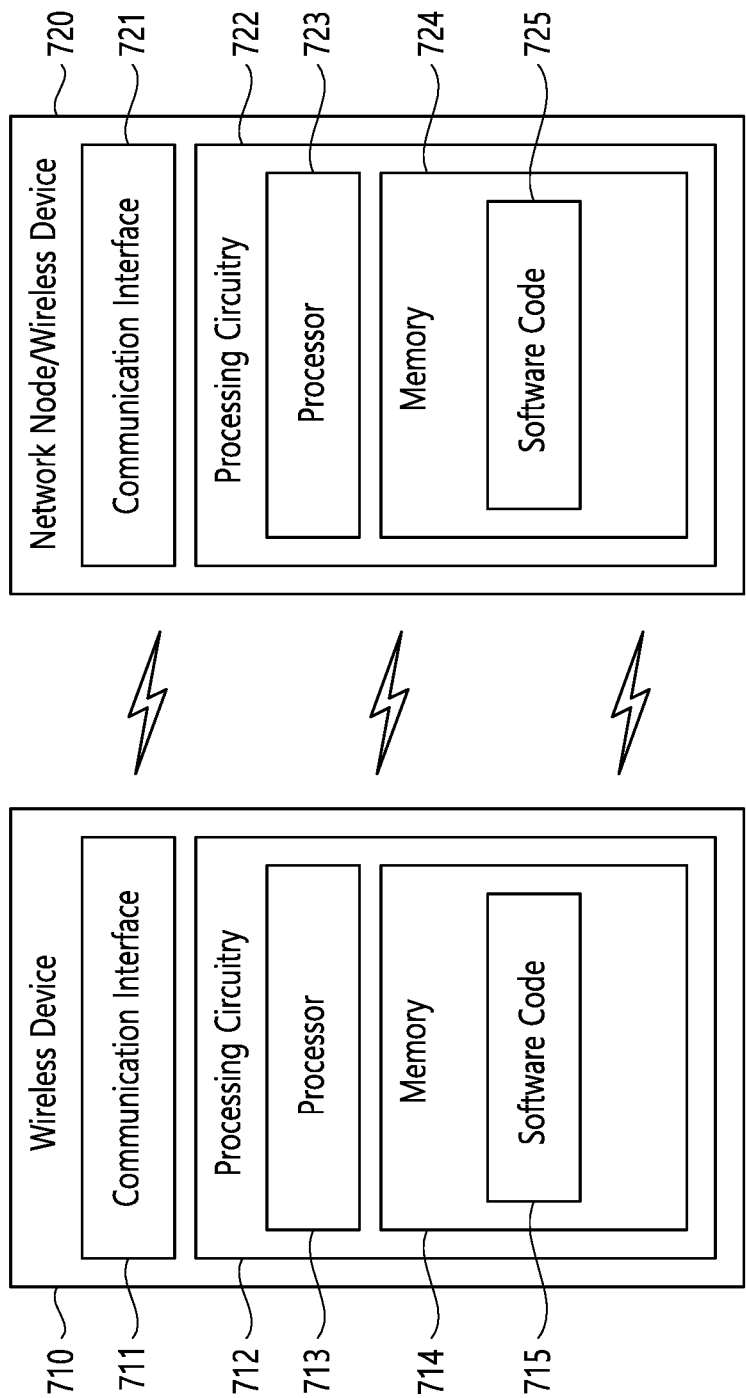
FIG. 19 is a block diagram illustrating an example of communication between a wireless device 710 and a network node 720.

FIG. 19 is a block diagram illustrating an example of communication between a wireless device 710 and a network node 720.

The network node 720 may be replaced with the wireless device or the UE of FIG. 19.

In the example above, the wireless device 710 includes one or more different wireless devices, network nodes and/or a communication interface 711 for communicating with other elements within a network. The communication interface 711 may include one or more transmitters, one or more receivers and/or one or more communication interfaces. The wireless device 710 includes a processing circuit 712. The processing circuit 712 may include one or more processors such as the processor 713 and one or more memories such as the memory 714.

The processing circuit 712 may be configured to control arbitrary methods and/or processes disclosed in the present disclosure and/or, for example, to allow the wireless device 710 to perform the methods and/or processes. The processor 713 corresponds to one or more processors for performing wireless device functions disclosed in the present disclosure. The wireless device 710 includes a memory 714 configured to store data, program software code and/or other information disclosed in the present disclosure.

In one or more implementations, when one or more processors such as the processor 713 are executed, the memory 714 is configured to store software code 715 including commands that instruct the processor 713 to perform the whole or part of the process descried in detail with respect to the implementation example of FIG. 19 and the present disclosure.

For example, one or more processors such as the processor 713 controlling one or more transceivers such as the transceiver 123 of FIG. 13 to transmit and receive information may perform one or more processes related to transmission and reception of information.

The network node 720 includes one or more different network nodes, wireless devices and/or a communication interface 721 for communicating with other elements on the network. Here, the communication interface 721 includes one or more transmitters, one or more receivers and/or one or more communication interfaces. The network node 720 includes a processing circuit 722. Here, the processing circuit includes a processor 723 and a memory 724.

In many implementations, when one or more processors such as the processor 723 are executed, the memory 724 is configured to store software code 725 including commands that instruct the processor 723 to perform the whole or part of the process descried in detail with respect to the implementation example of FIG. 19 and the present disclosure.

For example, one or more processors such as the processor 723 controlling one or more transceivers such as the transceiver 113 of FIG. 13 to transmit and receive information may perform one or more processes related to transmission and reception of information.

The embodiments of the present disclosure described above may also be applied to the following situation.

Figure 20:
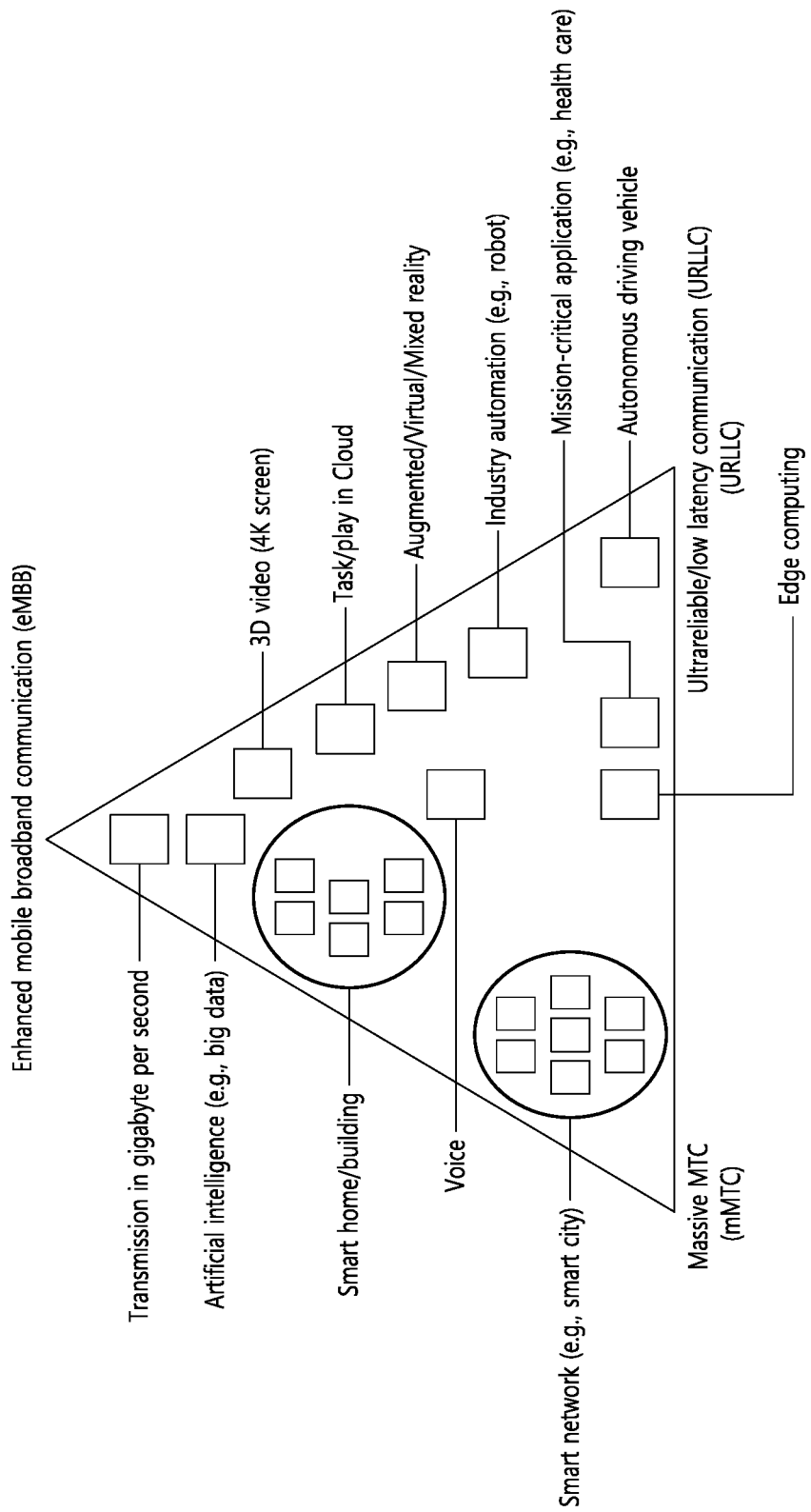
FIG. 20 illustrates examples of 5G usage scenarios to which the technical features of the present disclosure may be applied.

FIG. 20 illustrates examples of 5G usage scenarios to which the technical features of the present disclosure may be applied.

The 5G usage scenarios illustrated in FIG. 20 are merely exemplary, and the technical features of the present disclosure may also be applied to other 5G usage scenarios that are not illustrated in FIG. 20.

Referring to FIG. 20, three major requirement areas of 5G include: (1) an enhanced mobile broadband (eMBB) area, (2) a massive machine type communication (mMTC) area, and (3) a ultra-reliable and low latency communications (URLLC) area. Some examples of usage may require multiple areas for optimization, while other examples of usage may focus only on one key performance indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications. Data is one of the key motives for the 5G, and it will be the 5G era when dedicated voice services may disappear for the first time. In 5G, voice is expected to be processed by an application program simply using data connection provided by a communication system. The main reasons for the increased traffic volume are an increase in content size and an increase in the number of applications requiring high data transmission rates. Streaming services (audio and video), interactive videos, and mobile Internet accesses will become more popular as more devices are connected to the Internet. Many applications need to be activated at all times for connection to provide real-time information and push notifications for users. Cloud storages and applications are growing rapidly in a mobile communication platform and may be applied to both work and entertainment. The cloud storage is a special usage example leading to a growth in uplink data transmission rate. 5G is also used for remote tasks in the cloud and requires much lower end-to-end delays to maintain good user experiences when haptic interfaces are used. In terms of entertainment, for example, cloud gaming and video streaming are other key factors increasing the demand for mobile broadband capability. Entertainment is essential in smartphones and tablets anywhere, including high mobility environments such as trains, cars and airplanes. Other usage examples are augmented reality and information retrieval for entertainment. Here, the augmented reality requires very low latency and instantaneous data rates.

The mMTC, which is designed to enable communication between a large number of low-cost devices powered by batteries, is provided to support smart metering, logistics, fields, and applications such as body sensors. The mMTC aims at about 10-year batteries and/or about one million devices per km2. The mMTC enables smooth connection of embedded sensors in all fields and is expected as one of the most frequent examples of 5G usage. It is potentially predicted that there will be 20.4 billion IoT devices until 2020. Industrial IoT is one of the areas where 5G plays a major role in enabling smart cities, asset tracking, smart utilities, agriculture and security infrastructures.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 20 will be described in more detail.

5G, which is a means of providing streams that are rated as hundreds of megabits per second to a gigabit per second, may complement fiber-to-the-home (FTTH) and cable-based broadband (or data over cable service interface specifications (DOCSIS)). Such a high speed may be required to deliver a TV at a resolution of 4K or higher (6K, 8K and higher) as well as for virtual reality (VR) and augmented reality (AR). VR and AR applications include nearly immersive sporting events. Specific applications may require special network settings. For example, for a VR game, the game company may need to integrate the core server with the edge network server of the network operator to minimize latency.

Automotive vehicles are expected to be a new important motive in terms of 5G, together with many usage examples for mobile communications for vehicles. For example, entertainment for passengers needs both high capacity and high mobile broadband at the same time. This is because future users expect continuous high-quality connections regardless of their locations and speeds. Another usage example in the automatic vehicle field is an augmented reality dashboard. The augmented reality dashboard allows a driver to identify objects in the dark above what the driver are looking at through a front window. The augmented reality dashboard superimposes and displays information to be provided for the driver about the distance and movement of the object. In the future, a wireless module enables communication between vehicles, information exchange between a vehicle and a supporting infrastructure, and information exchange between a vehicle and another connected device (e.g., a device carried by a pedestrian). A safety system provides a guidance to an alternative course of action to help the driver to drive in a safer manner, thereby reducing the risk of an accident. The next step will be a remote controlled vehicle or an autonomous vehicle, which requires very reliable and very fast communication between different autonomous vehicles and/or between a vehicle and an infrastructure. In the future, autonomous vehicles will perform all driving activities, and drivers will focus only on traffic anomalies that the vehicle is not able to identify by itself. The technical requirements for autonomous vehicles are ultra-low latency and ultra-high reliability to increase traffic safety up to a level that cannot be achieved by a person.

Smart cities and smart homes, which are referred to as smart societies, will be embedded into high-density wireless sensor networks. The distributed networks of intelligent sensors will identify the conditions with regard to costs and energy-efficient maintenances of the cities or homes. Similar settings may be made for each home. Temperature sensors, windows, heating controllers, burglar alarms, and appliances are all connected wirelessly. Many of these sensors typically require low data transmission rates, low power consumptions, and low costs. However, for example, real-time HD videos may be required by certain types of devices for surveillance.

The consumption and distribution of energy, including heat or gas, is being highly decentralized, and requires automated control through distributed sensor networks. Smart grids interconnect these sensors using digital information and communication technologies to collect information and serve accordingly. The information may include behaviors of suppliers and consumers, allowing the smart grids to improve efficiency, reliability, economic feasibility, sustainability of production, and distribution of fuel such as electricity in an automated manner. The smart grid may be considered as another sensor network with low latency.

In the health sector, there are many applications that may use the benefits of mobile communications. The communication system may support telemedicine providing clinical care from a faraway place, thereby helping reduce barriers in distance and improving an access to a medical service that is not continuously available in a faraway rural area. The telemedicine is also used to save a life in a critical care situation or in an emergency situation. Wireless sensor networks based on mobile communications may provide remote monitoring and sensors for parameters such as a heart rate and a blood pressure.

Wireless and mobile communications are getting increasingly important in industrial applications. Wiring is expensive to install and maintain. Thus, the possibility of replacement with wireless links, which can reconfigure cables, is an attractive opportunity in various industry fields. To accomplish this, however, it is required that the wireless connection should work with latency, reliability, and capacity similar to the cable connection, and the management thereof should be simplified. Low latency and very low error probability are new requirements, by which 5G-based connection is required.

Logistics and freight tracking is an important usage example for mobile communications that enables the tracking of inventory and packages anywhere using a location-based information system. The usage example for logistics and freight tracking typically requires a low data transmission rate but requires wide-range and reliable location information.

Meanwhile, the apparatus described above may be a base station, a network node, a transmission UE, a reception UE, a wireless apparatus, a wireless communication apparatus, a vehicle, a vehicle mounted with an automatic driving function, a Connected Car, a drone (Unmanned Aerial Vehicle, UAV), an AI (Artificial Intelligence) module, a robot, an AR (Augmented Reality) apparatus, a VR (Virtual Reality) apparatus, an MR (Mixed Reality) apparatus, a hologram apparatus, a public safety apparatus, an MTC apparatus, an IoT apparatus, a medical apparatus, a pin tech apparatus (or financial apparatus), a security apparatus, a climate/environment apparatus, an apparatus related to 5G service or other apparatus related to the Fourth Industrial Revolution field.

For example, a UE may include a mobile phone, a smart phone, a laptop computer, a digital broadcasting terminal, a PDA (personal digital assistants), a PMP (portable multimedia player), a navigation, a slate PC, a tablet PC, an ultrabook, a wearable device (e.g., a smartwatch, a smart glass, an HMD (head mounted display), and the like. For example, the HMD may be a display device in the form of mounting on a head. For example, the HMD may be used to implement VR, AR or MR.

For example, the drone may be a flying object which is unmanned and flying by a wireless control signal. For example, the VR apparatus may include an apparatus for implementing an object or a background of a virtual world. For example, the AR apparatus may include an apparatus for implementing by connecting an object or a background of a virtual world to an object or a background of a real world. For example, the MR apparatus may include an apparatus for implementing by fusing an object or a background of a virtual world with an object or a background of a real world. For example, the hologram apparatus may include an apparatus for implementing 360-degree stereoscopic image by recording and displaying stereoscopic information by utilizing the interference phenomenon that occurs when two laser lights meet. For example, the public safety apparatus may include an image relay device or an image device wearable on a body of a user. For example, the MTC apparatus and the IoT apparatus may be apparatuses that do not require a direct intervention or manipulation of a human. For example, the MTC apparatus and the IoT apparatus may include a smart meter, a vending machine, a thermometer, a smart bulb, a door lock, or various types of sensors. For example, the medical apparatus may be an apparatus used for the purpose of diagnosing, curing, relieving, treating or preventing a disease. For example, the medical apparatus may be an apparatus used for the purpose of diagnosing, curing, relieving or correcting an injury or a disorder. For example, the medical apparatus may be an apparatus used for the purpose of examining, replacing or deforming a structure or a function. For example, the medical apparatus may be an apparatus used for the purpose of a pregnancy control. For example, the medical apparatus may include a diagnosing device, a surgical device, a (external) diagnosing device, a hearing-aid or a surgical procedure device. For example, the security apparatus may be an apparatus installed to prevent a danger that may occur and maintain a safety. For example, the security apparatus may be a camera, a CCTV, a recorder or a black box. For example, the pin tech apparatus may include a payment device or a POS (Point of Sales). For example, the climate/environment apparatus may include a device for monitoring or predicting a climate/environment.

The embodiments of the present disclosure described above may also be applied to the following technology.

<Artificial Intelligence (AI)>

Artificial intelligence refers to a field of studying artificial intelligence or a methodology for creating the same, and machine learning refers to a field of defining various problems dealing in an artificial intelligence field and studying methodologies for solving the same. The machine learning may be defined as an algorithm for improving performance with respect to a certain task through repeated experiences with respect to the task.

An artificial neural network (ANN) is a model used in machine learning and may refer in general to a model with problem-solving abilities, composed of artificial neurons (nodes) forming a network by a connection of synapses. The artificial neural network may be defined by a connection pattern between neurons on different layers, a learning process for updating model parameters, and an activation function for generating an output value.

The artificial neural network may include an input layer, an output layer, and optionally one or more hidden layers. Each layer includes one or more neurons, and the artificial neural network may include synapses that connect the neurons to one another. In the artificial neural network, each neuron may output a function value of an activation function with respect to the input signals inputted through a synapse, weight, and bias.

A model parameter refers to a parameter determined through learning, and includes weight of synapse connection, bias of a neuron, and the like. Moreover, hyperparameters refer to parameters which should be set before learning in a machine learning algorithm, and include a learning rate, the number of iterations, a mini-batch size, an initialization function, and the like.

The objective of training an artificial neural network is to determine a model parameter for minimizing a loss function. The loss function may be used as an indicator for determining an optimal model parameter in a learning process of an artificial neural network.

The machine learning may be classified into supervised learning, unsupervised learning, and reinforcement learning depending on the learning method.

The supervised learning may refer to a method for training an artificial neural network with training data that has been given a label. In addition, the label may refer to a target answer (or a result value) to be guessed by the artificial neural network when the training data is inputted to the artificial neural network. The unsupervised learning may refer to a method for training an artificial neural network using training data that has not been given a label. The reinforcement learning may refer to a learning method for training an agent defined within an environment to select an action or an action order for maximizing cumulative rewards in each state.

Machine learning implemented by a deep neural network (DNN) including a plurality of hidden layers of the artificial neural network may be referred to as deep learning, and the deep learning is a part of the machine learning. Hereinafter, the meaning of machine learning includes deep learning.

<Robot>

A robot may refer to a machine which automatically handles a given task by its own ability, or which operates autonomously. Particularly, a robot that functions to recognize an environment and perform an operation according to its own judgment may be referred to as an intelligent robot.

Robots may be classified into, for example, industrial, medical, household, and military robots, according to the purpose or field of use.

A robot may include an actuator or a driving unit including a motor in order to perform various physical operations, such as moving joints of the robot. In addition, a movable robot may include, for example, a wheel, a brake, and a propeller in the driving unit thereof, and through the driving unit, may thus be capable of traveling on the ground or flying in the air.

<Self-Driving or Autonomous-Driving>

Autonomous driving refers to self-driving technology, and an autonomous vehicle refers to a vehicle that moves without any manipulation by a user or with minimum manipulation by a user.

For example, autonomous driving may include all of a technology for keeping a vehicle within a driving lane, a technology for automatically controlling a speed such as an adaptive cruise control, a technology for automatically driving the vehicle along a determined route, and a technology for, when a destination is set, automatically setting a route and driving the vehicle along the route.

A vehicle includes a vehicle having only an internal combustion engine, a hybrid vehicle having both an internal combustion engine and an electric motor, and an electric vehicle having only an electric motor, and may include not only an automobile but also a train, a motorcycle, or the like.

In this case, an autonomous vehicle may be considered as a robot with an autonomous driving function.

<Extended Reality; XR>

Extended reality collectively refers to virtual reality (VR), augmented reality (AR), and mixed reality (MR). The VR technology provides real world objects or backgrounds only in CG images, the AR technology provides virtual CG images together with real object images, and the MR technology is computer graphic technology for mixing and combining virtual objects with the real world.

The MR technology is similar to the AR technology in that both real and virtual objects are shown together. However, there is a difference in that a virtual object is used to complement a real object in the AR technology, whereas a virtual object and a real object are used in an equivalent nature in the MR technology.

The XR technology may be applied to a head-mount display (HMD), a head-up display (HUD), a mobile phone, a tablet PC, a laptop, a desktop, a TV, digital signage, etc. A device to which the XR technology is applied may be referred to as an XR device.

Lastly, the claims written in the present disclosure may be combined in various manners. For example, the technical features of a method claim of the present disclosure may be combined and implemented as an apparatus, and the technical features of an apparatus claim of the present disclosure may be combined and implemented as a method. In addition, the technical features of a method claim and the technical features of an apparatus claim of the present disclosure may be combined and implemented as an apparatus, and the technical features of a method claim and the technical features of an apparatus claim of the present disclosure may be combined and implemented as a method.

What is claimed is:

1. A method performed by a user equipment (UE) that supports a wireless communication in an unlicensed band in a wireless communication system, comprising:
   receiving slot format related information (SFI) from a base station,
   wherein the SFI is information informing a slot format for at least one slot;
   determining the slot format for the at least one slot based on the SFI; and
   performing the wireless communication with the base station in the unlicensed band based on the slot format,
   wherein the SFI is received in every predetermined slot number or in every predetermined time,
   wherein the at least one slot for which the slot format is determined corresponds to the every predetermined slot,
   wherein minimum downlink resources are always defined for the SFI in the every predetermined slot, and
   wherein the slot format is determined for the at least one slot regardless of whether listen-before-talk (LBT) or sensing of the base station succeeds or not.

2. The method of claim 1, wherein, based on the SFI is not being received in a scheduled slot or a scheduled time, the UE attempts to receive the SFI persistently.

3. The method of claim 1, wherein the SFI defines an opposite or different resource direction for a resource direction defined by at least one of a semi-static downlink/uplink assignment, scheduling downlink control information (DCI), a synchronization signal block (SSB), a random access channel (RACH) resource with remaining minimum system information (RMSI), or a radio resource control (RRC) configuration.

4. The method of claim 1, wherein the UE applies the slot format from a slot on which the SFI is received or applies the slot format from an $N^{th}$ slot after the slot on which SFI is received, and
   wherein the N is a positive integer.

5. The method of claim 4, wherein, based on the UE applying the slot format from the $N^{th}$ slot after the slot on which SFI is received, the UE receives an offset value for the N from the base station.

6. The method of claim 1, wherein, based on a time on receiving the SFI being a middle time among the slots on which the slot format is defined, the UE applies the slot format from time on receiving the SFI to a remaining slot on which the slot format is defined.

7. The method of claim 1, wherein the UE communicates with at least one of a mobile terminal, a network and an autonomous driving vehicle except the UE.

8. The method of claim 1, wherein the UE implements at least one Advanced Driver Assistance System (ADAS) function based on a signal for controlling a motion of the UE, or
   wherein the UE receives a user input and switches a driving mode of the UE from an autonomous driving mode to a manual driving mode or switches a driving mode of the UE from a manual driving mode to an autonomous driving mode, or
   wherein the UE drives autonomously based on external object information, and wherein the external object information includes at least one of information on an existence of the object, position information of the object, distance information between the UE and the object and relative velocity information between the UE and the object.

9. A User Equipment (UE), comprising:
   a transceiver; and
   a processor operating with being coupled with the transceiver,
   wherein the processor is configured to:
   receive Slot Format related Information (SFI) from a base station,
   wherein the SFI is information informing a slot format for at least one slot;
   determine the slot format for the at least one slot based on the SFI; and
   perform a wireless communication with the base station in the unlicensed band based on the slot format,
   wherein the SFI is received in every predetermined slot, wherein the at least one slot for which the slot format is determined corresponds to the every predetermined slot, wherein minimum downlink resources are always defined for the SFI in the every predetermined slot, and wherein the slot format is determined for the at least one slot regardless of whether listen-before-talk (LBT) or sensing of the base station succeeds or not.

10. The UE of claim 9, wherein, based on the SFI is not being received in a scheduled slot or a scheduled time, the UE attempts to receive the SFI persistently.

11. The UE of claim 9, wherein the SFI defines an opposite or different resource direction for a resource direction defined by at least one of a semi-static downlink/uplink assignment, scheduling downlink control information (DCI), a synchronization signal block (SSB), a random access channel (RACH) resource with remaining minimum system information (RMSI), or a radio resource control (RRC) configuration.

12. The UE of claim 9, wherein the UE applies the slot format from a slot on which the SFI is received or applies the slot format from an $N^{th}$ slot after the slot on which SFI is received, and wherein the N is a positive integer.

13. The UE of claim 12, wherein, based on the UE applying the slot format from the $N^{th}$ slot after the slot on which SFI is received, the UE receives an offset value for the N from the base station.

14. The UE of claim 9, wherein, based on a time on receiving the SFI being a middle time among the slots on which the slot format is defined, the UE applies the slot format from time on receiving the SFI to a remaining slot on which the slot format is defined.

15. A method performed by a base station that supports a wireless communication in an unlicensed band in a wireless communication system, comprising:

transmitting slot format related information (SFI) to a user equipment, wherein the SFI is information informing a slot format for at least one slot; and performing the wireless communication with the UE in the unlicensed band based on a slot format, wherein the slot format is determined for the at least one slot based on the SFI, wherein the SFI is transmitted in every predetermined slot number or in every predetermined time, wherein the at least one slot for which the slot format is determined corresponds to the every predetermined slot, wherein minimum downlink resources are always defined for the SFI in the every predetermined slot, and wherein the slot format is determined for the at least one slot regardless of whether listen-before-talk (LBT) or sensing of the base station succeeds or not.

* * * * *